United States Patent
Uchida et al.

(10) Patent No.: US 6,744,921 B1
(45) Date of Patent: Jun. 1, 2004

(54) IMAGE PROCESSING APPARATUS AND METHOD THAT DETERMINES THE THICKNESS OF CHARACTERS AND LINES

(75) Inventors: Yoshiki Uchida, Kawasaki (JP); Shinobu Arimoto, Yokohama (JP); Yushi Matsukubo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/954,226

(22) Filed: Oct. 20, 1997

Related U.S. Application Data

(63) Continuation of application No. 08/365,678, filed on Dec. 29, 1994, now abandoned.

(30) Foreign Application Priority Data

Dec. 29, 1993 (JP) .............................. 5-354528

(51) Int. Cl.⁷ ................................ G06K 9/00
(52) U.S. Cl. .................. 382/185; 382/176; 382/199; 382/165; 382/182; 358/462
(58) Field of Search .................. 382/265, 173, 382/175, 197, 162, 260, 163, 164, 165, 199, 171, 172, 182, 181, 183, 188, 185; 358/529, 453, 538, 462, 464, 449, 488, 403

(56) References Cited

U.S. PATENT DOCUMENTS

| | | | |
|---|---|---|---|
| 4,700,399 A | 10/1987 | Yoshida ...................... 382/17 |
| 4,813,078 A | 3/1989 | Fujiwara et al. ............... 382/21 |
| 4,860,118 A | 8/1989 | Arimoto ..................... 358/451 |
| 4,887,227 A | * 12/1989 | Tsujioka et al. ............. 358/1.11 |
| 4,958,219 A | 9/1990 | Kadowaki ..................... 358/75 |
| 4,985,760 A | 1/1991 | Maeshima et al. ............. 358/80 |
| 5,031,034 A | 7/1991 | Shimizu et al. ............... 358/79 |
| 5,047,844 A | 9/1991 | Ikeda et al. .................... 358/80 |
| 5,113,252 A | * 5/1992 | Horie et al. ................. 358/451 |
| 5,119,185 A | 6/1992 | Ikeda et al. ..................... 358/75 |
| 5,126,838 A | 6/1992 | Ohsawa et al. ................ 358/75 |
| 5,164,996 A | * 11/1992 | Paster ......................... 382/203 |
| 5,165,072 A | 11/1992 | Kurita et al. ............... 358/448 |
| 5,239,383 A | 8/1993 | Ikeda et al. ................. 358/300 |
| 5,251,023 A | * 10/1993 | Arimoto et al. ............. 358/529 |
| 5,311,336 A | * 5/1994 | Kurita et al. ................ 358/453 |
| 5,315,382 A | 5/1994 | Tanioka ....................... 358/523 |
| 5,392,365 A | * 2/1995 | Steinkirchner .............. 382/266 |
| 5,398,124 A | * 3/1995 | Hirota ........................ 358/530 |
| 5,420,938 A | * 5/1995 | Funada et al. .............. 382/173 |

FOREIGN PATENT DOCUMENTS

| | | | |
|---|---|---|---|
| EP | 0106354 | 4/1984 | ............ G06K/9/48 |
| EP | 0334472 | 9/1989 | ............ G06K/9/34 |
| EP | 0348145 | 12/1989 | .......... H04N/1/387 |
| JP | 3-010571 A | 1/1991 | |
| JP | 3-064272 | 3/1991 | ............ H04N/1/46 |
| JP | 4-314183 | 11/1992 | ........... G06F/15/68 |

* cited by examiner

*Primary Examiner*—Timothy M. Johnson
*Assistant Examiner*—Seyed Azarian
(74) *Attorney, Agent, or Firm*—Fitzpatrick, Cella, Harper & Scinto

(57) ABSTRACT

Black correction to character, lines, and the like, is performed smoothly so as to maintain quality of an image as much as possible. In a character thickness determining circuit 114 of a black character determination unit 113, the thickness of characters and lines are determined based on RGB signals. Further, character/line outline information is obtained at an edge detector 115, and chromaticity information is obtained at a chromaticity determining unit 116. When an image processing is performed based on the combination of the outline information and the chromaticity information, a thickness determination signal is corrected so that the thickness of the character, lines, and like changes continuously.

14 Claims, 28 Drawing Sheets

FIG. 18

| A11 | A21 | A31 | A41 | A51 |
|-----|-----|-----|-----|-----|
| A12 | A22 | A32 | A42 | A52 |
| A13 | A23 | A33 | A43 | A53 |
| A14 | A24 | A34 | A44 | A54 |
| A15 | A25 | A35 | A45 | A55 |

VALUES OF DIRAMI ASSOCIATED WITH
NEIGHBORING PIXELS OF A PIXEL OF INTEREST

FIG. 19
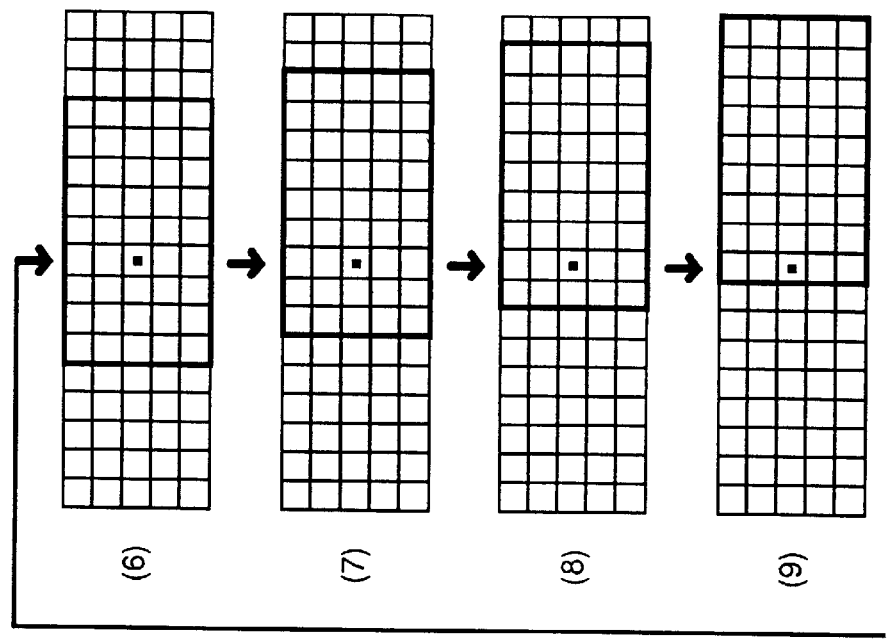
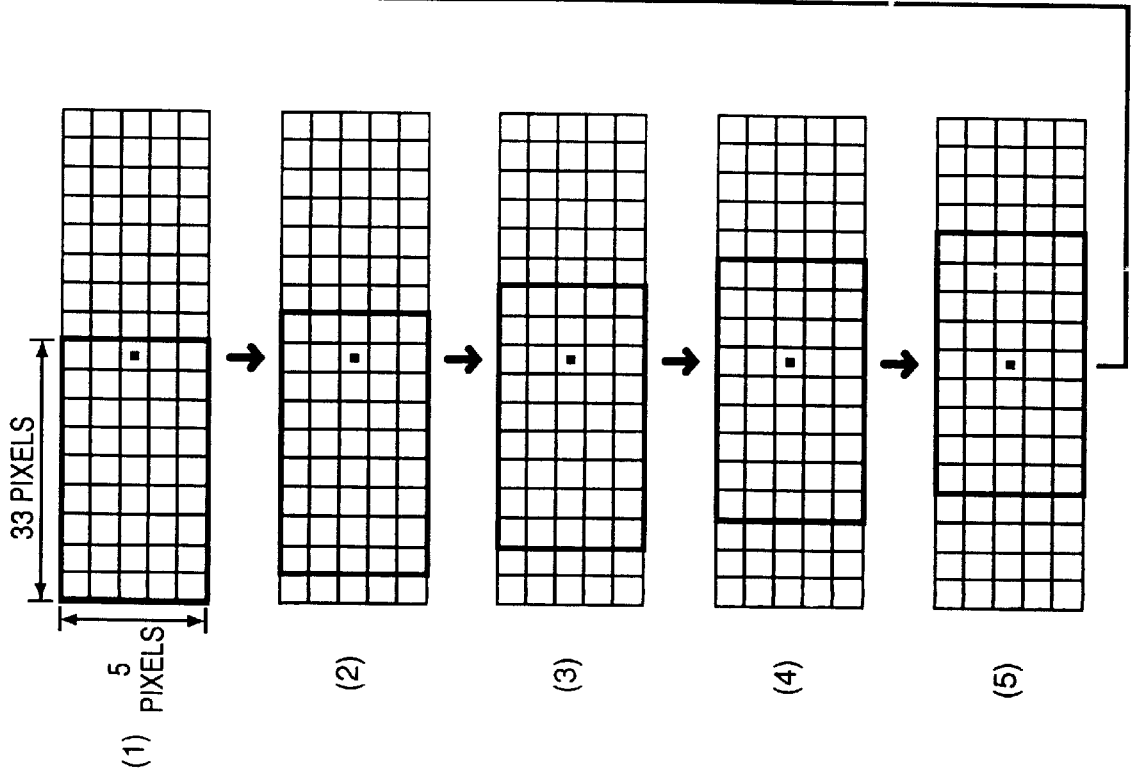

FIG. 23

| 0 | 1 | 2 | 3 | 4 | 5 | 6 | CODE |
|---|---|---|---|---|---|---|------|
| H | H | H | H | H | H | H | 7 |
| H | H | H | H | H | H | L | 6 |
| H | H | H | H | H | L | L | 5 |
| H | H | H | H | L | L | L | 4 |
| H | H | H | L | L | L | L | 3 |
| H | H | L | L | L | L | L | 2 |
| H | L | L | L | L | L | L | 1 |
| L | L | L | L | L | L | L | 0 |

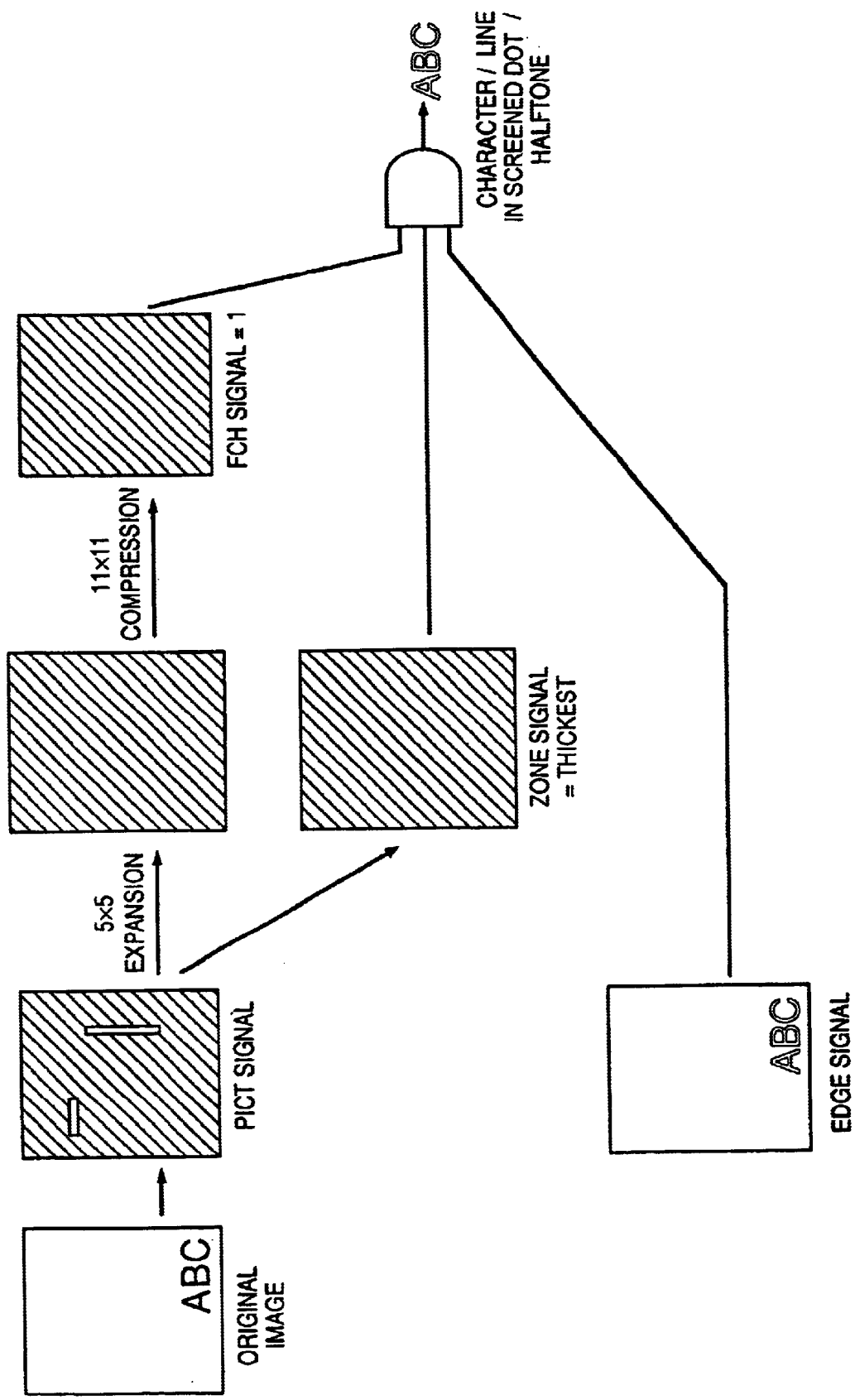

FIG. 26A

| INPUT | | | | OUTPUT | | |
|---|---|---|---|---|---|---|
| col | zone | edge | FCH | ucr | filter | sen |
| 1 (BLACK) | 0 | INTERNAL | X | 3 | 0 | 0 |
| | | 1×1 | X | 0 | 1 | 1 |
| | | 3×3 | X | 0 | 1 | 1 |
| | | 5×5 | X | 0 | 1 | 1 |
| | | 7×7 | X | 0 | 1 | 1 |
| | 1 | INTERNAL | X | 3 | 0 | 0 |
| | | 1×1 | X | 1 | 1 | 1 |
| | | 3×3 | X | 1 | 1 | 1 |
| | | 5×5 | X | 1 | 1 | 1 |
| | | 7×7 | X | 3 | 0 | 0 |
| | 2 | INTERNAL | X | 4 | 0 | 0 |
| | | 1×1 | X | 2 | 1 | 1 |
| | | 3×3 | X | 2 | 1 | 1 |
| | | 5×5 | X | 2 | 0 | 0 |
| | | 7×7 | X | 4 | 0 | 0 |
| | 3 | INTERNAL | X | 5 | 0 | 0 |
| | | 1×1 | X | 3 | 1 | 0 |
| | | 3×3 | X | 3 | 1 | 0 |
| | | 5×5 | X | 5 | 0 | 0 |
| | | 7×7 | X | 5 | 0 | 0 |
| | 4 | INTERNAL | X | 6 | 0 | 0 |
| | | 1×1 | X | 4 | 2 | 0 |
| | | 3×3 | X | 4 | 2 | 0 |
| | | 5×5 | X | 6 | 0 | 0 |
| | | 7×7 | X | 6 | 0 | 0 |
| | 5 | INTERNAL | X | 7 | 0 | 0 |
| | | 1×1 | X | 5 | 2 | 0 |
| | | 3×3 | X | 5 | 2 | 0 |
| | | 5×5 | X | 7 | 0 | 0 |
| | | 7×7 | X | 7 | 0 | 0 |
| | 6 | INTERNAL | X | 7 | 0 | 0 |
| | | 1×1 | X | 6 | 2 | 0 |
| | | 3×3 | X | 7 | 0 | 0 |
| | | 5×5 | X | 7 | 0 | 0 |
| | | 7×7 | X | 7 | 0 | 0 |
| | 7 | INTERNAL | 1 | 7 | 3 | 0 |
| | | 1×1 | 1 | 7 | 3 | 0 |
| | | 3×3 | 1 | 7 | 3 | 0 |
| | | 5×5 | 1 | 7 | 3 | 0 |
| | | 7×7 | 1 | 7 | 3 | 0 |
| | | INTERNAL | 0 | 7 | 3 | 0 |
| | | 1×1 | 0 | 3 | 0 | 0 |
| | | 3×3 | 0 | 7 | 3 | 0 |
| | | 5×5 | 0 | 7 | 3 | 0 |
| | | 7×7 | 0 | 7 | 3 | 0 |

X : DON'T CARE

FIG. 26B

| INPUT | | | | OUTPUT | | |
|---|---|---|---|---|---|---|
| col | zone | edge | FCH | ucr | filter | sen |
| 0 (OTHER THAN BLACK) | 0 | INTERNAL<br>1×1<br>3×3<br>5×5<br>7×7 | X<br>X<br>X<br>X<br>X | 7<br>7<br>7<br>7<br>7 | 0<br>1<br>1<br>1<br>1 | 0<br>1<br>1<br>1<br>1 |
| | 1 | INTERNAL<br>1×1<br>3×3<br>5×5<br>7×7 | X<br>X<br>X<br>X<br>X | 7<br>7<br>7<br>7<br>7 | 0<br>1<br>1<br>1<br>0 | 0<br>1<br>1<br>1<br>0 |
| | 2 | INTERNAL<br>1×1<br>3×3<br>5×5<br>7×7 | X<br>X<br>X<br>X<br>X | 7<br>7<br>7<br>7<br>7 | 0<br>1<br>1<br>0<br>0 | 0<br>1<br>1<br>0<br>0 |
| | 3 | INTERNAL<br>1×1<br>3×3<br>5×5<br>7×7 | X<br>X<br>X<br>X<br>X | 7<br>7<br>7<br>7<br>7 | 0<br>1<br>1<br>0<br>0 | 0<br>0<br>0<br>0<br>0 |
| | 4 | INTERNAL<br>1×1<br>3×3<br>5×5<br>7×7 | X<br>X<br>X<br>X<br>X | 7<br>7<br>7<br>7<br>7 | 0<br>2<br>2<br>0<br>0 | 0<br>0<br>0<br>0<br>0 |
| | 5 | INTERNAL<br>1×1<br>3×3<br>5×5<br>7×7 | X<br>X<br>X<br>X<br>X | 7<br>7<br>7<br>7<br>7 | 0<br>2<br>2<br>0<br>0 | 0<br>0<br>0<br>0<br>0 |
| | 6 | INTERNAL<br>1×1<br>3×3<br>5×5<br>7×7 | X<br>X<br>X<br>X<br>X | 7<br>7<br>7<br>7<br>7 | 0<br>2<br>0<br>0<br>0 | 0<br>0<br>0<br>0<br>0 |
| | 7 | INTERNAL<br>1×1<br>3×3<br>5×5<br>7×7 | X<br>X<br>X<br>X<br>X | 7<br>7<br>7<br>7<br>7 | 0<br>3<br>0<br>0<br>0 | 0<br>0<br>0<br>0<br>0 |

X : DON'T CARE

FIG. 28

$$Bk1 = -255 \times \log\left(\frac{\text{Min CMY}}{255}\right)\left(\frac{1}{1.52}\right) \quad \text{---} (2101)$$

$$\begin{pmatrix} C2 \\ M2 \\ Y2 \\ Bk2 \end{pmatrix} = \begin{pmatrix} m11 \times k11 & m21 \times k21 & m31 \times k31 & m41 \times k41 & m51 \times k51 & m61 \times k61 & m71 \times k71 & m81 \times k81 \\ m12 \times k12 & m22 \times k22 & m32 \times k32 & m42 \times k42 & m52 \times k52 & m62 \times k62 & m72 \times k72 & m82 \times k82 \\ m13 \times k13 & m23 \times k23 & m33 \times k33 & m43 \times k43 & m53 \times k53 & m63 \times k63 & m73 \times k73 & m83 \times k83 \\ m14 \times k14 & m24 \times k24 & m34 \times k34 & m44 \times k44 & m54 \times k54 & m64 \times k64 & m74 \times k74 & m84 \times k84 \end{pmatrix} \begin{pmatrix} C1 \\ M1 \\ Y1 \\ Bk1 \\ C1M1 \\ M1Y1 \\ Y1C1 \\ Bk1Bk1 \end{pmatrix} \quad \text{---} (2102)$$

IMAGE PROCESSING APPARATUS AND METHOD THAT DETERMINES THE THICKNESS OF CHARACTERS AND LINES

This application is a continuation of application Ser. No. 08/365,678 filed Dec. 29, 1994, now abandoned.

BACKGROUND OF THE INVENTION

The present invention relates to an image processing apparatus and method and, more specifically, to an image processing apparatus having a function to extract characteristics of an input image and to a method to extract the same.

A color printing system, such as a color printing apparatus which digitally processes color image data and outputs the data to a color printer to obtain a color image and a digital color copy machine which electrically reads a color original by decomposing colors of the original and copies a color image by printing an image based on the obtained color image data on a printing sheet, has become popular.

As these systems have become commonly used, the demand for higher quality of printing a color image has increased. Especially, it is demanded to print black characters and lines in darker black color and more sharply. When an original written in black is color-decomposed, signals of yellow, magenta, cyan, and black are generated to represent the original black color. By performing printing operation in accordance with these generated signals, the original black is reproduced by the four colors, thus without placing ink of the four colors exactly in the same positions, the reproduced image has blurred outlines in black thin lines, which prevents the reproduced black line from looking black, or makes black characters or lines look blurred. Thus, the quality of a printed image may drop considerably.

In order to overcome the above-mentioned problem, there is suggested a method to extract color information on black portions or on color portions other than black in image signals, and extract characteristics of space frequencies of thin lines, screened dot, or the like, thereby to detect an area of black characters or colored characters, for instance, further to divide the image signals into areas of halftone images and screened dot images and to apply a process which is proper to each area, and to simplify black color reproduction if the area is a black character portion.

However, according to the aforesaid conventional method, in order to reproduce characters whose font is Mincho (one of Japanese character types), for instance, which changes in thickness of a character in different parts of the character, there is a problem in that borders of the character are so clearly jagged that the border can be apparently recognized. Further, in a case where a character exists in a screened dot image, since the edge of the character can not be distinguished from the edge of a dot, a process for black characters can not be performed. Therefore, black characters are not always processed with proper operation, which prevents the reproduction quality of an image from improving.

Further, since a character area can not be recognized in high resolution, a rate of character recognition (known as optical character reader) remains low.

SUMMARY OF THE INVENTION

The present invention has been made in consideration of the above situation, and has its object to solve aforesaid conventional problems.

Accordingly, an object of the present invention is to improve recognition quality of characteristics of an input image. Especially, to improve recognition of character area of the input image.

According to the present invention, foregoing object is attained by providing an image processing apparatus comprising: input means for inputting image data representing an image; detecting means for detecting a character portion of the image; judging means for judging a width of the character portion; and processing means for processing the image data in accordance with the judgment result of the judging means.

Further, another object of the present invention is to apply a proper process on black characters.

Still another object of the present invention is to provide a copying apparatus capable of reproducing an image more faithful to an original image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 18 shows regulations of facing edge detection;

FIG. 19 shows a shape of a window of a counter 2049;

FIG. 23 shows encode regulations of an encoder 2083;

FIG. 25 shows a specific way of processing with the algorithm shown in FIG. 23;

FIGS. 26A and 26B show contents corresponding input/output of the LUT 117;

FIG. 28 shows equations for masking UCR operation.

DETAILED DESCRIPTION OF THE PREFERRED EMBODIMENT(S)

Preferred embodiment of the present invention will be described in detail in accordance with the accompanying drawings.

Figure 1:
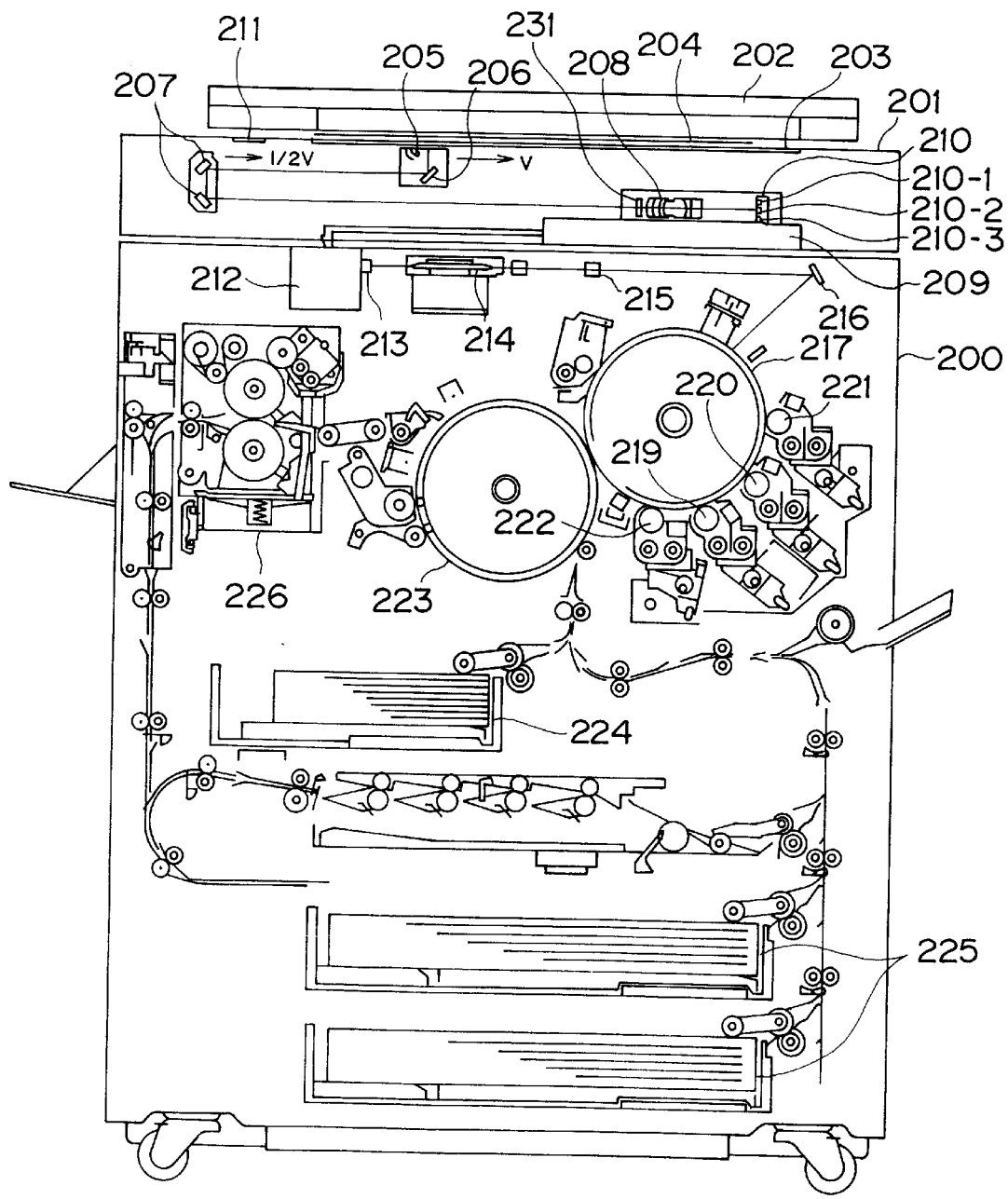
FIG. 1 is a sectional view of an image processing apparatus according to an embodiment of the present invention.

FIG. 1 shows a sectional view of an image processing apparatus according to the embodiment of the present invention. In FIG. 1, an image scanner 201 reads an original image, and digitally processes read data of the original image into digital signals. A printer 200 prints out an image corresponding to the original image read by the image scanner 201 on a printing sheet in full color.

In the image scanner 201, an original 204 is set on a platen glass covered with a document cover 202, and exposed by a halogen lamp 205. The reflected light from the original 204 is further reflected by mirrors 206 and 207, then focuses on a three-line sensor 210 (abbreviated as CCD, hereinafter) for R, G, and B after passing through the lens 208. It should be noted that the lens 208 is covered by an infrared filter 231.

The CCD 210 separates color information on the original 204 into full-color information of red (R) component, green (G) component, and blue (B) component, and converts the full-color information into color signals. Then the CCD 210 sends the signals to a signal processing unit 209. Each row of sensors in the CCD 210 for reading respective color components is composed of 5000 pixels, thus the CCD 210 can read across the shorter side of an A3 sized original, namely 297 mm, at 400 dpi resolution.

The halogen lamp 205 and the mirror 206 move at speed v, and the mirror 207 moves at speed (½)v in perpendicular direction with respect to the electrical scanning direction of the line sensors 210 (called as main scanning direction, hereinafter) Accordingly, the entire original 204 can be scanned.

A standard white board 211 generates correction data for correcting read data by R, G, B photo sensors 210-1 to 210-3. The standard white board 211 has uniform reflection characteristics in the visible light range, and looks white. In the embodiment, this standard white board 211 is used for correcting data outputted from the R, G, B photo sensors 210-1 to 210-3.

Further, in the signal processing unit 209, the read signals are electrically processed and separated into color components of magenta (M), cyan (C), yellow (Y), and black (Bk), then sent to the printer 200. For each scanning operation by the image scanner 201, one of the color component data of M, C, Y, and Bk is sent to the printer 200. Thus, by scanning the original four times, one color image is formed.

In printer 200, each image signal of M, C, Y, and Bk from the image scanner 201 is sent to a laser driver 212. The laser driver 212 drives a semi-conductor laser 213 by signals modulated on the basis of the image signals. Then the laser beam scans an electrostatic drum 217 via a polygon mirror 214, a f-θ lens 215, and a mirror 216.

The developer is composed of a magenta developer 219, a cyan developer 220, a yellow developer 221, and a black developer 222. These four developers touch the electrostatic drum 217 by turns, and they develop the latent image of M, C, Y, and Bk, formed on the electrostatic drum 217, with the corresponding color toner. Further, a transfer drum 223 attracts a paper sheet fed from a paper cassette 224 or 225, and a toner image developed on the electrostatic drum 217 is transferred on the paper sheet.

As described above, toner images of the four colors, M, C, Y, and Bk, are transferred, then the paper sheet is ejected after passing through a fixing unit 226.

Next, the image scanner 201 is explained in detail below.

Figure 2:
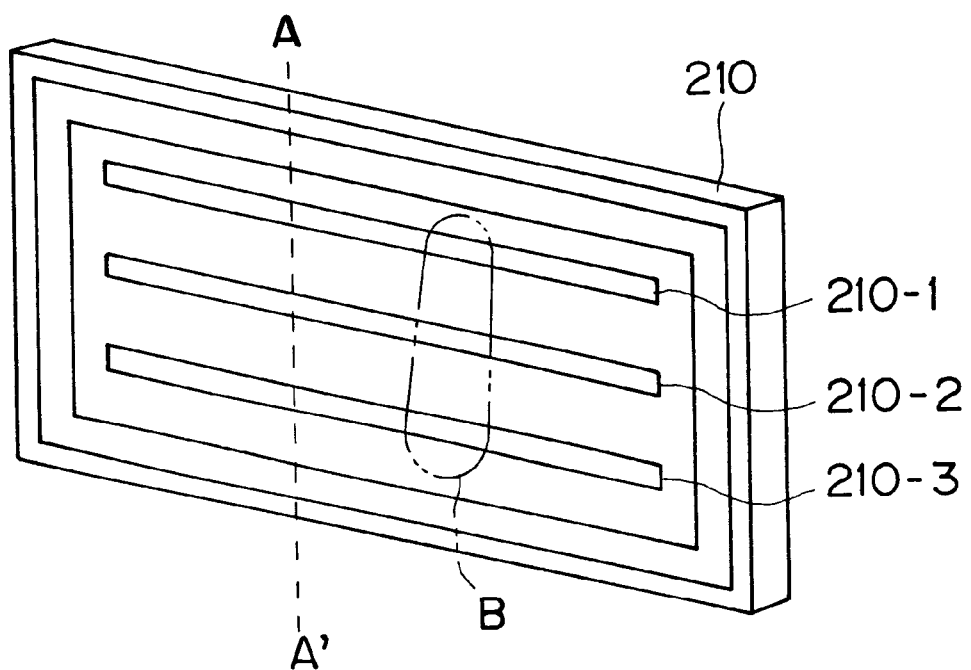
FIG. 2 is an external view of a CCD 210.

FIG. 2 is an external view of the CCD 210. In FIG. 2, reference numeral 210-1 denotes column of the photo sensor for detecting red (R) light; 210-2 and 210-3, columns of the photo sensors for detecting green (G) light and blue (B) light, respectively. Each of these R, G, and B sensors 210-1 to 210-3 has an opening of a size of 10 μm in the main scanning and sub-scanning directions.

The aforesaid three columns of photo sensors having different optical characteristics form monolithic configuration on a single silicon chip in order to be provided in parallel each other so that each of R, G, and B sensors can read the identical line of an original in the sub-scanning direction. Since there are some distances between each sensors, thus respective sensors read the original at the different positions at the same time. By using the CCD having aforesaid constitution, it is possible to unify optical elements, such as a lens, for reading respective color components, accordingly, to simplify an optical tuning operation for respective R, G, and B colors.

Figure 3:
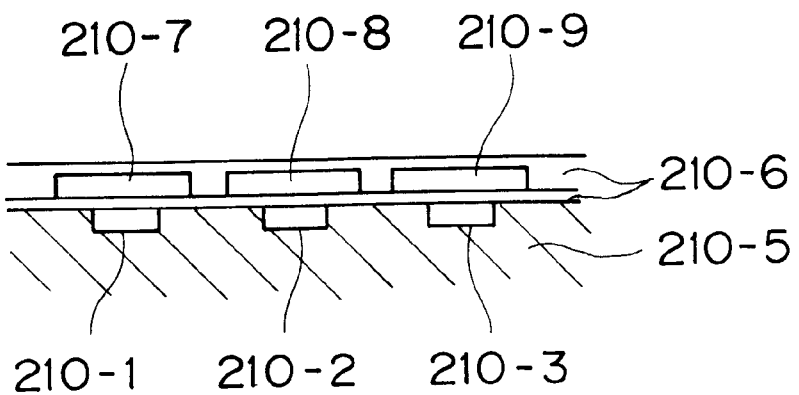
FIG. 3 is a sectional view of an image scanner 201 taken along a line A—A' in FIG. 2.

FIG. 3 is a sectional view of the image scanner 201 taken along a line A–A' in FIG. 2. As shown in FIG. 3, there provided on a silicon substrate 210-5 are the photo sensor 210-1 for reading R color, the photo sensors 210-2 and 210-3 for reading G and B colors, respectively.

On the R photo sensor 210-1, an R filter 210-7 which allows only R range light to pass out of the visible light is provided. Likewise, a G filter 210-8 is provided on the G photo sensor 210-2, and a B filter 210-9 is provided on the B photo sensor 210-3. Note that reference numeral 210-6 denotes a flat layer composed of a transparent organic film.

Figure 4:
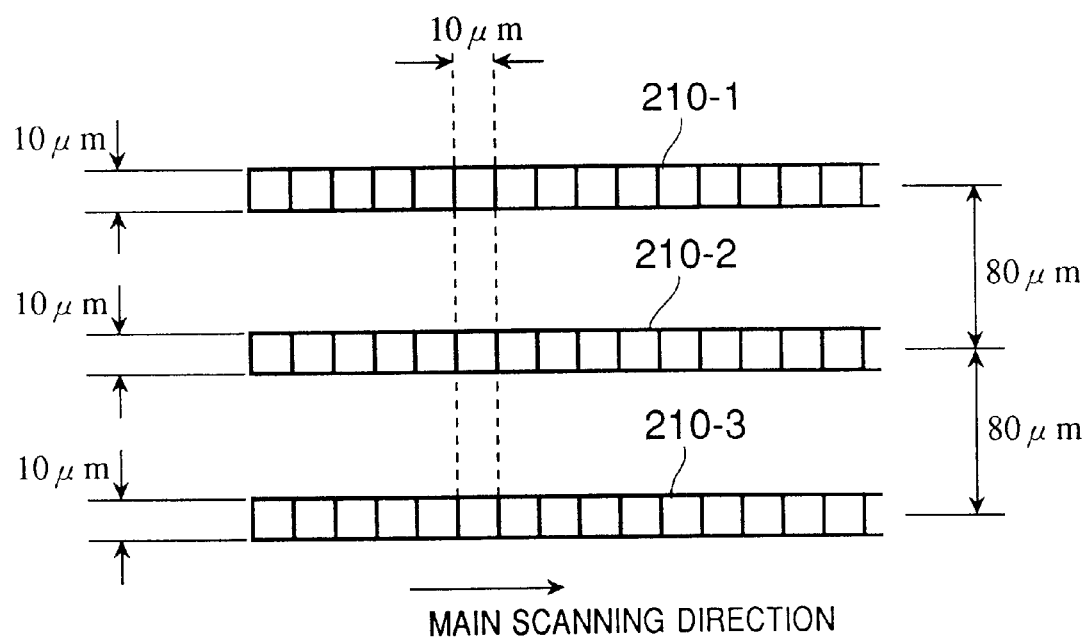
FIG. 4 is a magnified view of a photo sensing element denoted as reference numeral B in FIG. 2.

FIG. 4 is a magnified view of a light receiving element denoted as B in FIG. 2. As shown in FIG. 4, aforesaid each sensor has a 10 μm width per pixel in the main scanning direction and the sub-scanning direction. Each sensor has 5000 pixels in the main scanning direction so as to read across the shorter side of an A3 sized original (297 mm) at 400 dpi resolution. Further, the spacing between sensors of R, G, B is 80 μm, which corresponds 8 lines at the 400 dpi resolution in the sub-scanning direction.

Next, a method of density reproduction at the printer of the image processing apparatus according to the present invention will be described.

In the present embodiment, emission time of the semi-conductor laser 213 (FIG. 1) for density reproduction by the printer is controlled in accordance with an image density signal by utilizing the known PWM (pulse width modulation) method. Accordingly, an electrostatic latent image is formed on the electrostatic drum 217 (FIG. 1) depending on the emission time of the laser beam. Then, the density is reproduced by developing the latent image with toner whose amount corresponds to the potential of the latent image.

Figure 5:
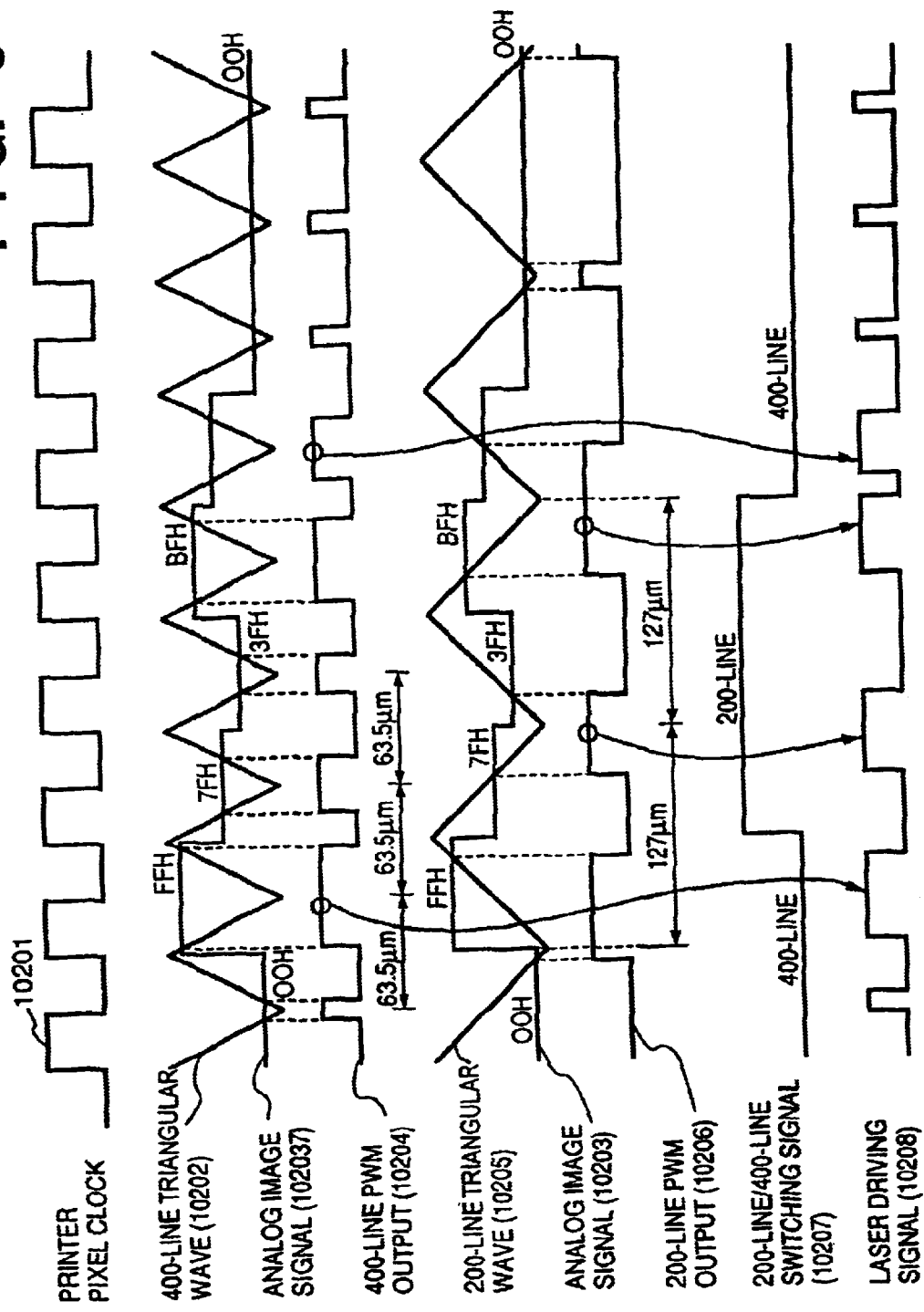
FIG. 5 is a timing chart showing an operation of controlling density reproduction by a printer according to the embodiment.

FIG. 5 is a timing chart showing an operation of controlling density reproduction by a printer according to the embodiment. Reference numeral 10201 denotes a printer pixel clock which corresponds to 400 dpi resolution. Note that this clock is issued at the laser driver 212 (FIG. 1). Further, a 400-line triangular wave 10202 is formed in synchronization with the printer pixel clock 10201. Note that the period of the 400-line triangular wave 10202 is the same as the period of the printer pixel clock 10201.

The image data of M, C, Y. Bk, sent from the image signal processing unit 209 (FIG. 1), which is of 400 dpi resolution and of 256 tones (8 bits), and a 200-line/400-line switching signal are transmitted in synchronization with the printer pixel clock signal, and the synchronization with the printer pixel clock 10201 is performed by a FIFO memory (not shown) at the laser driver 212 (FIG. 1). The eight-bit digital image data is converted into an analog image signal 10203 by a D/A converter (not shown). Then the image signal 10203 is compared with the 400-line triangular wave 10202, and as a result a 400-line PWM output 10204 is generated.

Digital pixel data varies from 00H (H indicates the hexadecimal system) to FFH, and pulse width of the 400-line PWM output 10204 depends on those values. A period of the 400-line PWM output 10204 corresponds to 63.5 μm on an electrostatic drum.

In laser driver 212 (FIG. 1), besides the 400-line triangular wave, a 200-line triangular 10205, which has doubled period of the former triangular wave, is generated, in synchronization with the printer pixel clock 10201. Then the 200-line triangular 10205 is compared to the 400 dpi analog signal 10203, and a 200-line PWM output signal 10206 is generated. A latent image is formed on the electrostatic drum in accordance with the 200-line PWM output signal 10206 at a period corresponding to a wavelength of 127 μm.

Comparing the density reproductions by the 200-line method that of the 400-line method, since the minimum unit for density reproduction for 200 lines is 127 μm which is double that for 400 lines, tones are reproduced in high quality by using 200 lines. However, as for the resolution, the density reproduction by 400 lines, capable of reproducing the density at a unit of 63.5 μm, is more suitable for high resolution image recording. As described above, 200-line PWM recording is suitable for tone reproduction, whereas 400-line PWM recording is superior in resolution, thus the 200-line PWM recording and the 400-line PWM recording can be changed depending upon the characteristics of an image to be printed.

A 200-line/400-line switching signal 10207 is used for switching aforesaid PWM's, and inputted to the laser driver 212 (FIG. 1) from the image signal processing unit 109 (FIG. 1) in a pixel unit in synchronization with an image signal of 400 dpi. When the 200-line/400-line switching signal is logically "Low" (will be indicated as L level, hereinafter), the 400-line PMW output is selected, whereas when the 200-line/400-line switching signal is logically "High" (will be indicated as H level, hereinafter), the 200-line PMW output is selected.

Next, the image signal processing unit 209 (FIG. 1) will be explained.

Figure 6:
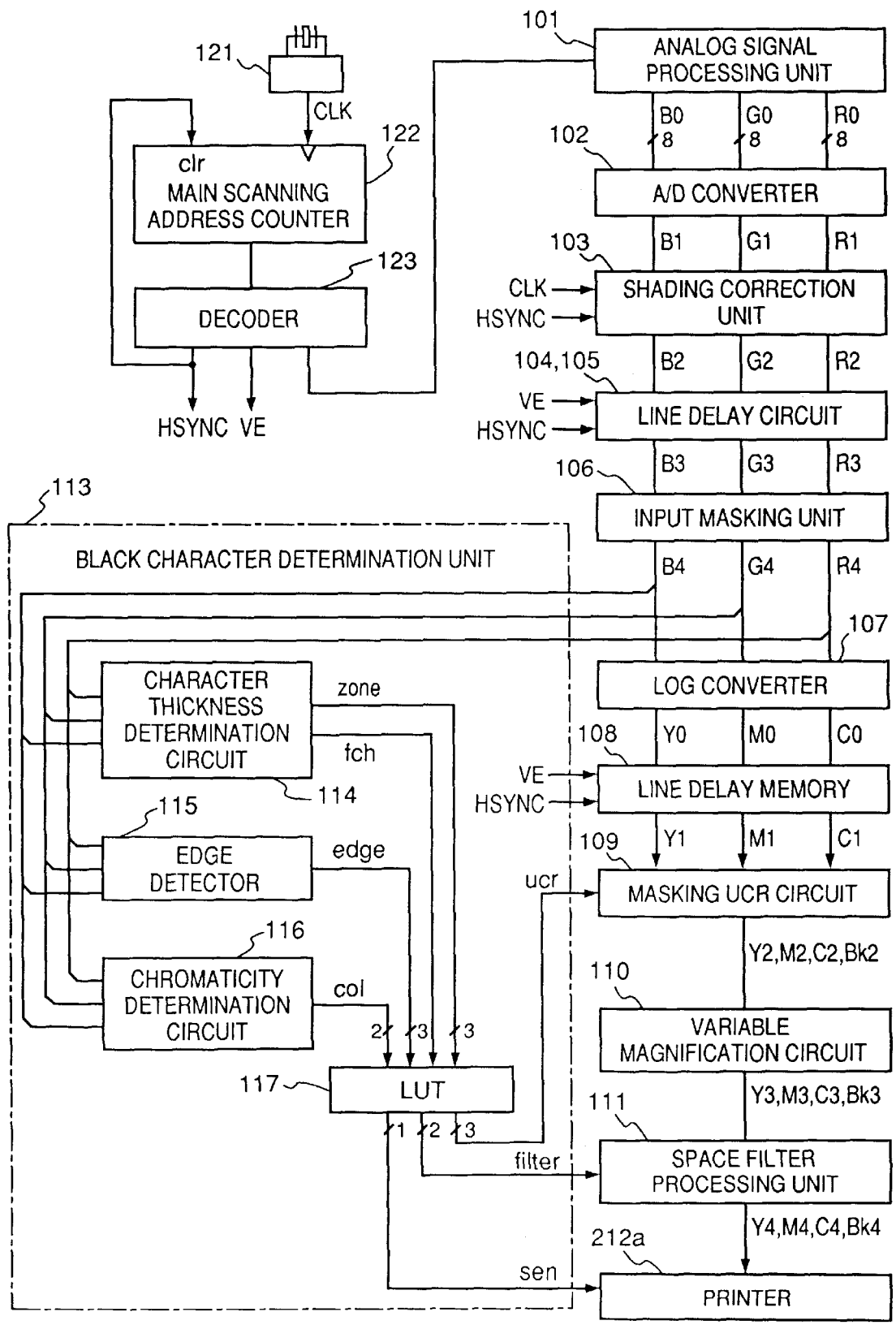
FIG. 6 is a block diagram showing a flow of an image signal in the image signal processing unit 209 of the image scanner 201 according to the embodiment.

FIG. 6 is a block diagram showing a flow of an image signal in the image signal processing unit 209 of the image scanner 201 (FIG. 1) according to the embodiment. The image signal outputted from the CCD 210 (FIG. 1) is inputted to the analog signal processing unit 101, therein the signal is processed with gain adjustment and off set adjustment. After that, each color signal is converted into eight-bit digital image signal, R1, G1, and B1 at an A/D converter 102. Then these signals are inputted to a shading correction circuit 103, and a known shading correction which uses a reading signal of standard white board 211 (FIG. 1) for each color is applied to the signal.

A clock generator 121 generates a clock signal per pixel unit. Further, a main scanning address counter 122 counts a number of clock signals from the clock generator 121, and generates pixel address output of one line. Then, a decoder 123 decodes the pixel address output (a main scanning address) from the main scanning address counter 122 and generates a CCD driving signal per line, such as a shift pulse and a reset pulse, a VE signal showing an effective area in the read signal per line from the CCD, and a line synchronization signal, HSYNC. It should be noted that the main scanning address counter 122 is reset in accordance with the HSNC signal, and starts counting main scanning address of the next line.

As shown in FIG. 2, photo sensors, 210-1, 210-2, and 210-3, of the CCD 210 are provided at a predetermined interval to each other, so that a spatial gap in the sub-scanning direction is corrected in line delay circuits 104 and 105 in FIG. 6. Specifically, R and G signals are line-delayed in the sub-scanning direction with respect to B signal to match the timing with the B signal.

The input masking unit 106 converts a reading color space determined by color decomposition characteristics of R, G and B filters 210-7, 210-8, and 210-9 of the CCD 210 into a standard color space of NTSC, and performs matrix operation as follow.

$$\begin{bmatrix} R4 \\ G4 \\ B4 \end{bmatrix} = \begin{bmatrix} a11 & a12 & a13 \\ a21 & a22 & a23 \\ a31 & a32 & a33 \end{bmatrix} \begin{bmatrix} R3 \\ G3 \\ B3 \end{bmatrix} \quad (1)$$

The light intensity/density converter (called LOG converter, hereinafter) 107 is composed of a look-up table ROM, and converts the luminance signals of R4, G4, and B4 into density signals, C0, M0, and Y0, respectively. A line delay memory 108 delays the image signals of C0, M0, and Y0 for an interval of line delay until a determination signal, such as UCR (under color removal), FILTER, and SEN, is generated from the R4, G4, and B4 signals by a black character determination unit 113, which will be explained later. As a result, the C1, M1, and Y1 image signals and a black character determination signal corresponding to a pixel are simultaneously inputted into a masking UCR circuit 109.

The masking UCR circuit 109 extracts black (Bk) signals from the inputted Y1, M1, and C1 signals of three primary colors, further applying operation to correct impurity of color of color printing materials used in a printer 212a. Then, Y2, M2, C2, and Bk2 signals are outputted at a predetermined bit width (eight bits) every time a reading operation is performed.

A variable magnification circuit 110 expands and compresses an image signal and a black character determination signal in the main scanning direction by performing known interpolation processing. Further, a space filter processing unit (output filter) 111 changes over edge enhancement and smoothing in accordance with a two-bit FILTER signal from a LUT 117, as will be described later.

Frame-sequential image signals, M4, C4, Y4, and Bk4 (signals of each color component per frame unit), which are processed as described above, and a SEN signal which is a change over signal of 200 lines and 400 lines, are sent to the aforesaid laser driver 212 (FIG. 1), then an image is printed in density by a PWM method at the printer 200 (FIG. 1).

Figure 7:
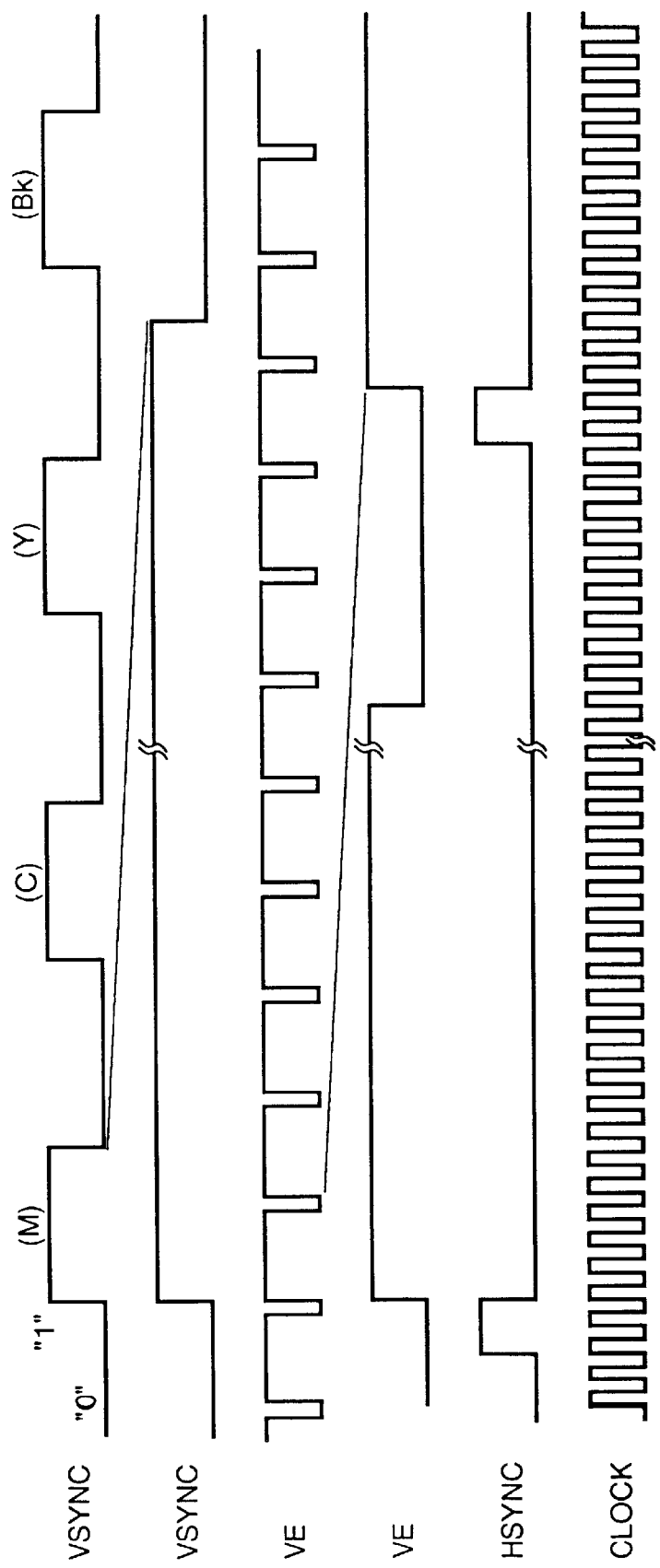
FIG. 7 is a timing chart illustrating timing of control signals in the image signal processing unit 209 described in FIG. 6.

FIG. 7 shows timing of respective control signals at the signal processing unit 209 (FIG. 1) which is described in detail in FIG. 6. In FIG. 7, a VSYNC signal is an image-effective-interval signal in the sub-scanning direction, and an image is scanned while the signal is logic "1" in value, and output signals, M, C, Y, and Bk are generated at each time the image is scanned. Further, the VE signal is an image effective interval signal in the main scanning direction, and start of the main scanning takes timing during the period when the signal is logic "1" in value. The signal is mainly used for controlling the line counting for line delay. The CLOCK signal is a pixel synchronization signal, and image data is transmitted at the timing when the signal changes from logic "0" in value to logic "1" in value, thus the image data is provided to each signal processing unit such as the A/D converter 102 (FIG. 6) and the black character determination circuit 113 (FIG. 6). The CLOCK signal is also used for transmitting an image signal and a change-over signal of 200-line/400-line to the laser driver 212 (FIG. 1).

Next, a process for detecting a black character/line will be explained.

Figure 8:
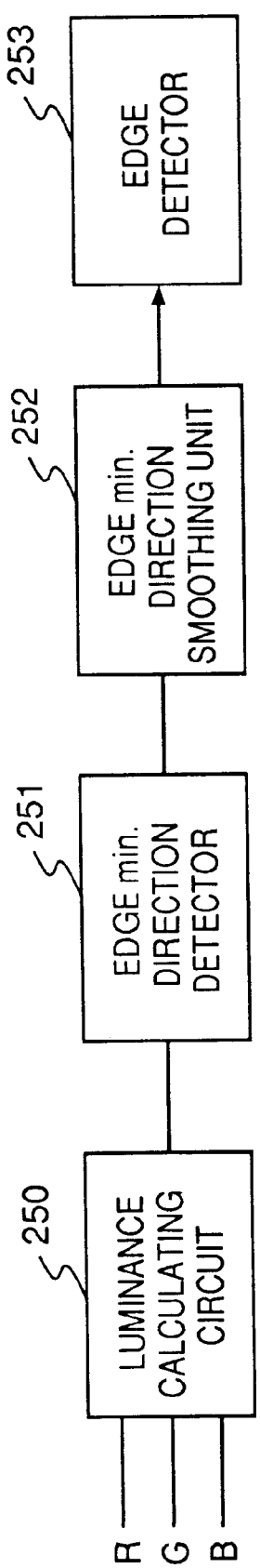
FIG. 8 is a block diagram illustrating an internal construction of an edge detector 115.

The signals R4, G4, and B4 which are masking-converted at the input masking unit 106 (FIG. 6) are inputted to an edge detector 115 (FIG. 6) of the black character determination unit 113 (FIG. 6) and an luminance signal Y is calculated by operating the following equation. Note that FIG. 8 is a block diagram showing the configuration of the edge detector 115 (FIG. 6), and FIG. 9 shows the detailed configuration of the luminance calculating circuit 250 (FIG. 8).

$$Y=0.25R+0.5G+0.25B \qquad (2)$$

Figure 9:
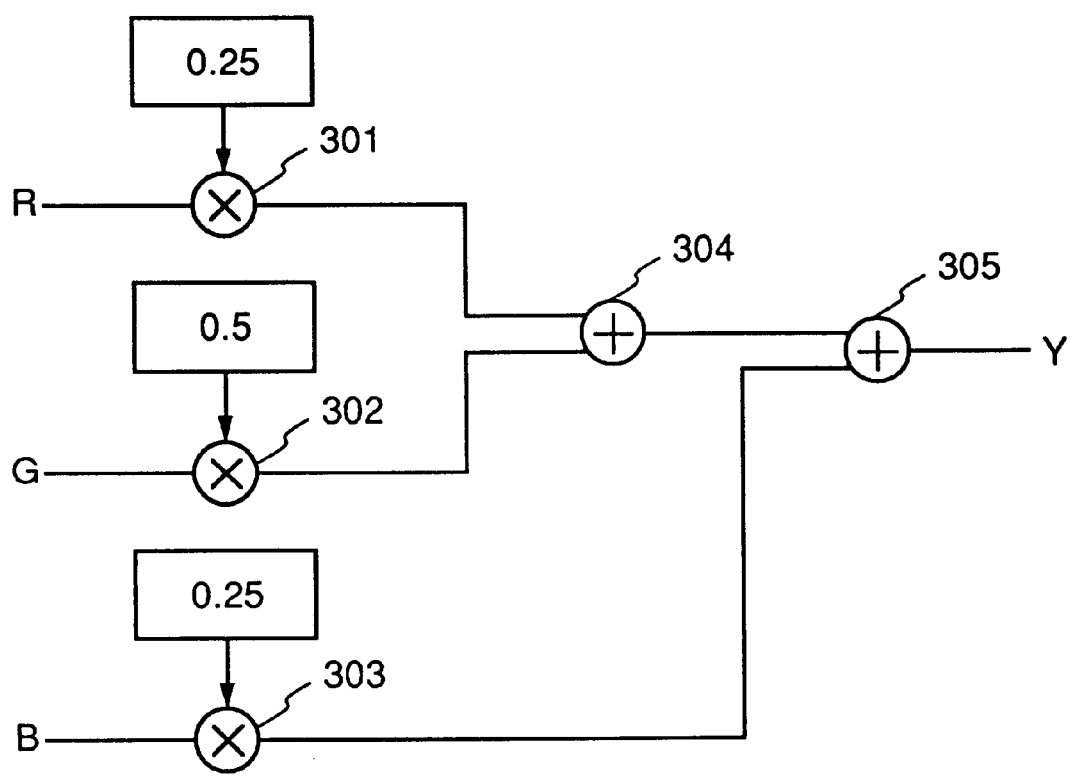
FIG. 9 is an explanatory view of a character thickness determination circuit 114.

In FIG. 9, the inputted color signals R, G, and B are multiplied by coefficients 0.25, 0.5, and 0.25 at multipliers 301, 302, and 303, respectively, then the obtained values are further added at adders 304 and 305. Thereby the luminance signal Y is obtained which is a calculation result of the above equation (2).

Figure 10:
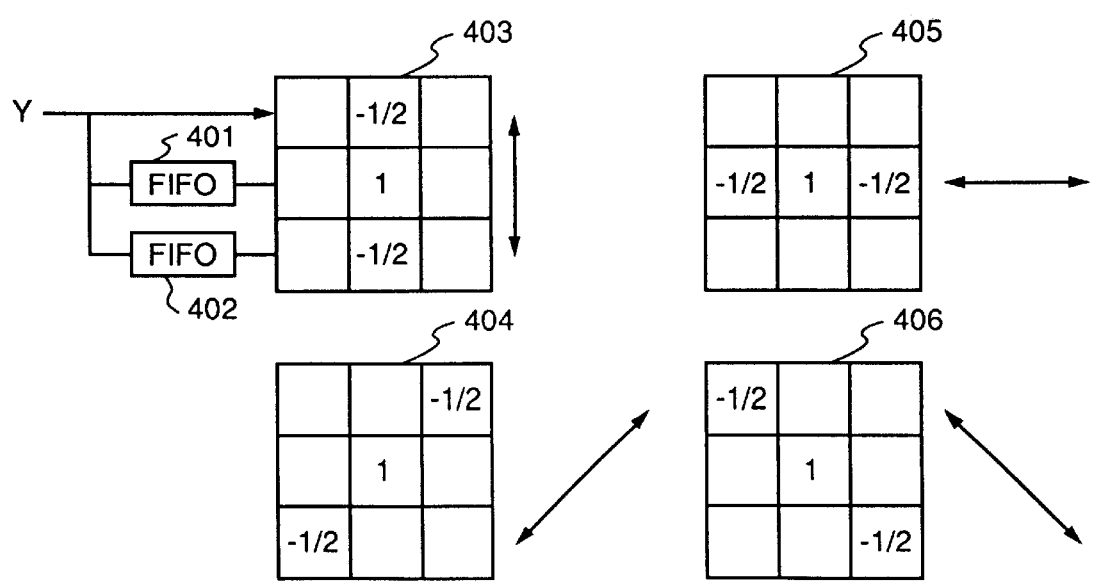
FIG. 10 is an explanatory view for line delay by FIFOs and Laplacean filters.

The luminance signal Y is expanded into three lines as a result of delay by FIFOs 401 and 402, each of which causes one line delay, shown in FIG. 10, and filtered by known Laplacean filters 403 to 406. Then, a direction in which an absolute value a of the amount of edge component which is the output of the filter becomes minimum is found. The direction is denoted as the edge min direction. This process is performed by an edge min direction detector 251 in FIG. 8.

Next, at an edge min direction smoothing unit 252, smoothing process is applied to the luminance signal Y in the edge min direction which is obtained at the edge min direction detector 251. By applying the smoothing process, it is possible to maintain the amount of edge component in the direction where the edge component is the largest, and to smooth edge component of other directions.

In other words, as for screened dot component having the larger edge component in the plurality of directions, its edge component is smoothed by an aforesaid process which reduce characteristics of it, whereas, as for a character/line having an edge component in only one direction, its characteristic is maintained. Note that by repeating this process as many times as necessary, a line component is separated from a screened dot component more effectively, thereby it makes it possible to detect a character component contained in a screened dot, which was impossible to detect in conventional methods.

After that, the input signals are filtered by the aforesaid Laplacian filters at the edge detector 253 to eliminate signals having absolute values of edge amount which are less or equal to the value a, then signals having absolute values of edge amount which are larger than the value a are outputted as logical "1".

Figure 11A:
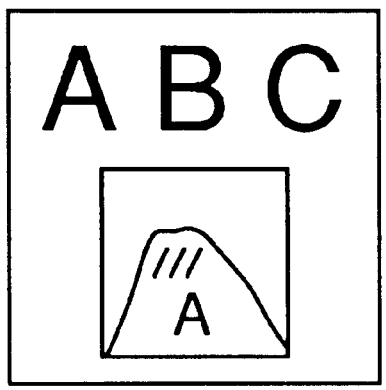
FIGS. 11A and 11B show an example of edge detection.
Figure 11B:
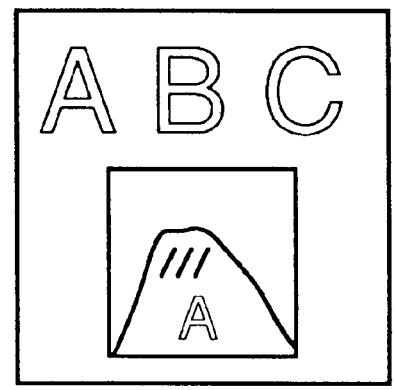

FIGS. 11A and 11B show an example of edge detection, wherein image data of luminance data Y in FIG. 11A becomes as an edge detection signal in a form as shown in FIG. 11B.

The edge detector 115 outputs a signal of "edge" (three bits) represented by five codes, that is, the codes indicating a signal generated by expanding an input signal by a block size of 7×7, a signal expanded by a block size of 5×5, a signal expanded by a block size of 3×3, a signal which is not expanded, and a signal indicating the absence of edge. It should be noted that the expanded signals are signals obtained by performing a logical OR operation on signal values of every pixel in the block. Namely, the "edge" is a three-bit code containing a total of five kinds of information, that is, information whether there is any pixel determined as an edge in a pixel block of 7×7, in a 5×5 pixel block, and in a 3×3 pixel block, where all the blocks include a pixel of interest, and whether or not the pixel of interest is determined as an edge. The "edge" is outputted by each pixel.

Figure 12:
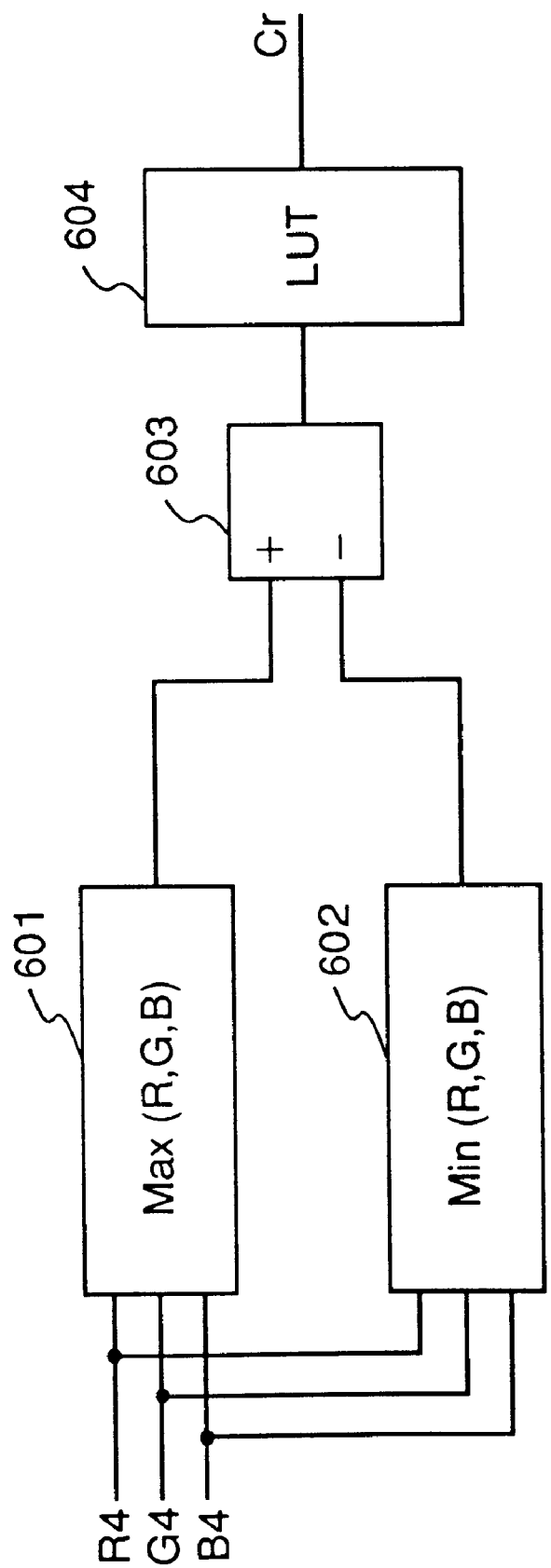
FIG. 12 is a block diagram illustrating a detailed construction of a chromaticity determination circuit 116 of a black character determination unit 113.

FIG. 12 is a block diagram illustrating the detailed configuration of a chromaticity determination circuit 11 (FIG. 6) composing the black character determination circuit 113 (FIG. 6). At a maximum value detector 601 and a minimum value detector 602, a maximum value, max(R, G, B) and a minimum value, min(R, G, B) are respectively extracted with respect to the inputted color signals R4, G4, and B4, and the difference ΔC (=max(R, G, B)−min(R, G, B) is calculated by a subtractor 603. Then next at a LUT (look up table) 604, data conversion in accordance with characteristics as shown in FIG. 13 is performed, and a chromaticity signal Cr is generated.

Figure 13:
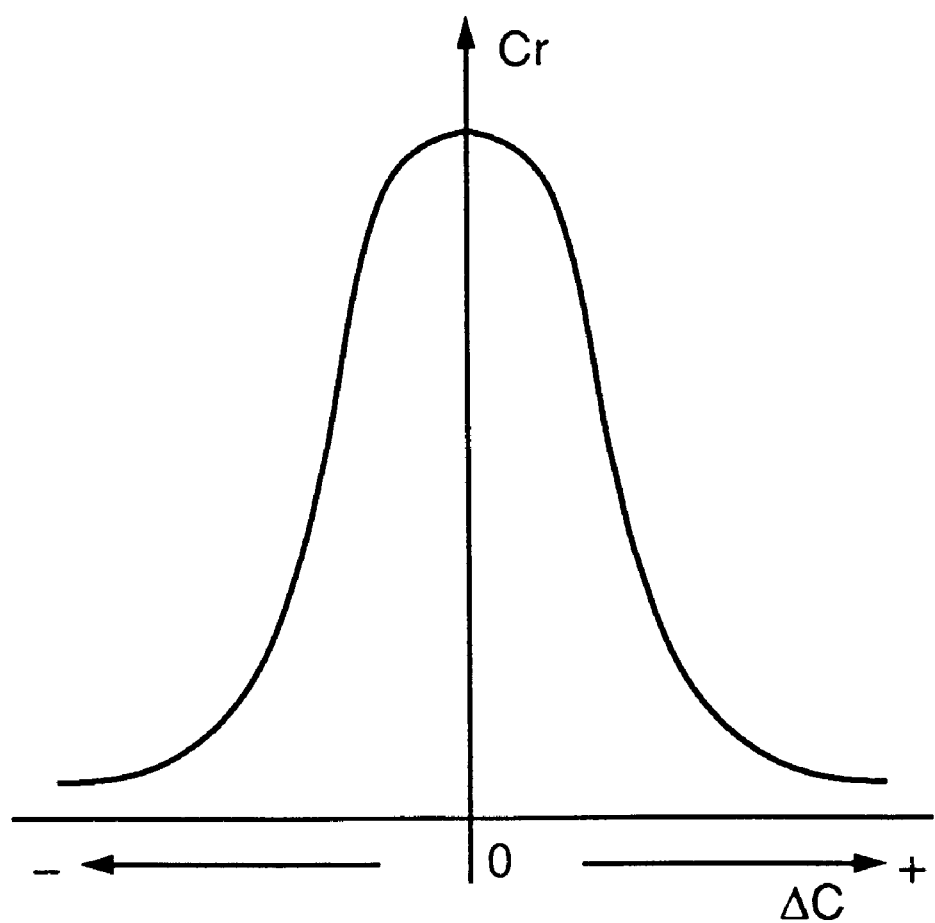
FIG. 13 illustrates characteristics of data conversion in a LUT.

FIG. 13 shows that as the chromaticity becomes lower (closer to non-chromaticity), a value of ΔC approaches to 0, whereas as the chromaticity becomes stronger, a value of ΔC increases. In other words, Cr has the larger value as the non-chromaticity of color becomes larger, whereas the value of Cr approaches to 0 as chromaticity becomes larger. It should be noted that a signal "col", outputted from the chromaticity determination circuit 116 in FIG. 6, represents "color", "black", "halftone" (indicating a color between "color" and "black"), and "white" by two-bit code. The signal "col" is outputted in every pixel.

Figure 14:
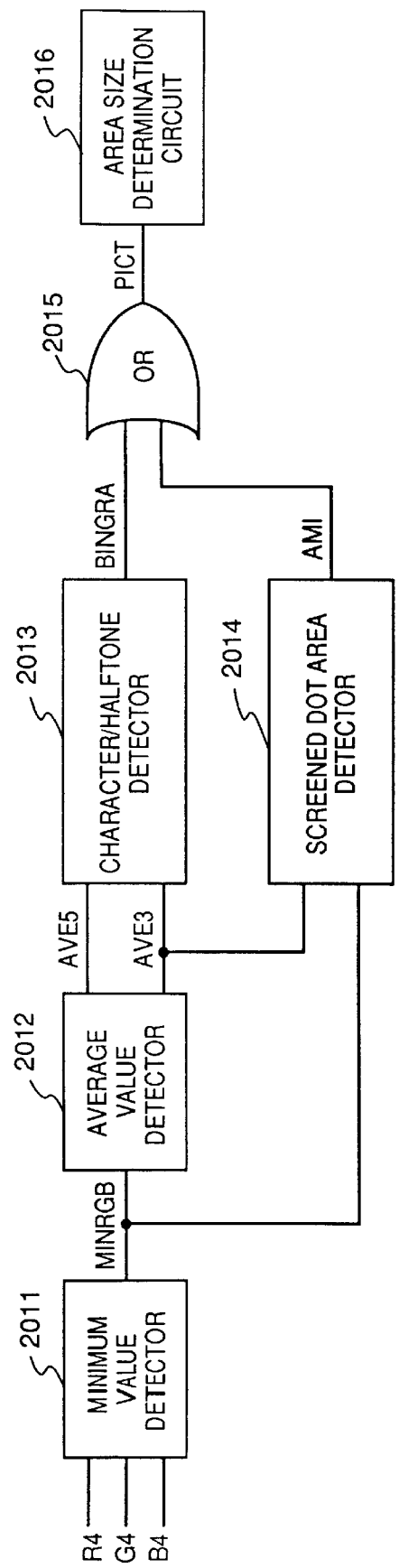
FIG. 14 is a block diagram showing a configuration of the character thickness determination circuit 114 of the black character determination unit 113.

FIG. 14 is a block diagram showing the construction of a character thickness determination circuit 114 composing the black character determination unit 113 (FIG. 6).

In FIG. 14, red signal R4, green signal G4, and blue signal B4 which are the outputs from the input masking unit 106 (FIG. 6) are inputted into a minimum value detector 2011. At the minimum value detector 2011, a minimum value MIN RGB of the inputted RGB signals is found. Next, the MIN RGB is inputted into an average value detector 2012, thus obtaining an average value AVE5 of the MIN RGB inside a block of 5×5 pixels composed of neighboring pixels of a pixel of interest, and an average value AVE3 of the MIN RGB inside a block of 3×3 pixels composed of neighboring pixels of a pixel of interest.

The AVE5 and the AVE3 are inputted into a character/halftone detector 2013, thereat density of a pixel of interest and amount of change in an average density between the pixel of interest and its neighboring pixels are determined by each pixel. Accordingly, it is determined that whether or not the pixel of interest composes a part of a character or a halftone area.

Figure 15:
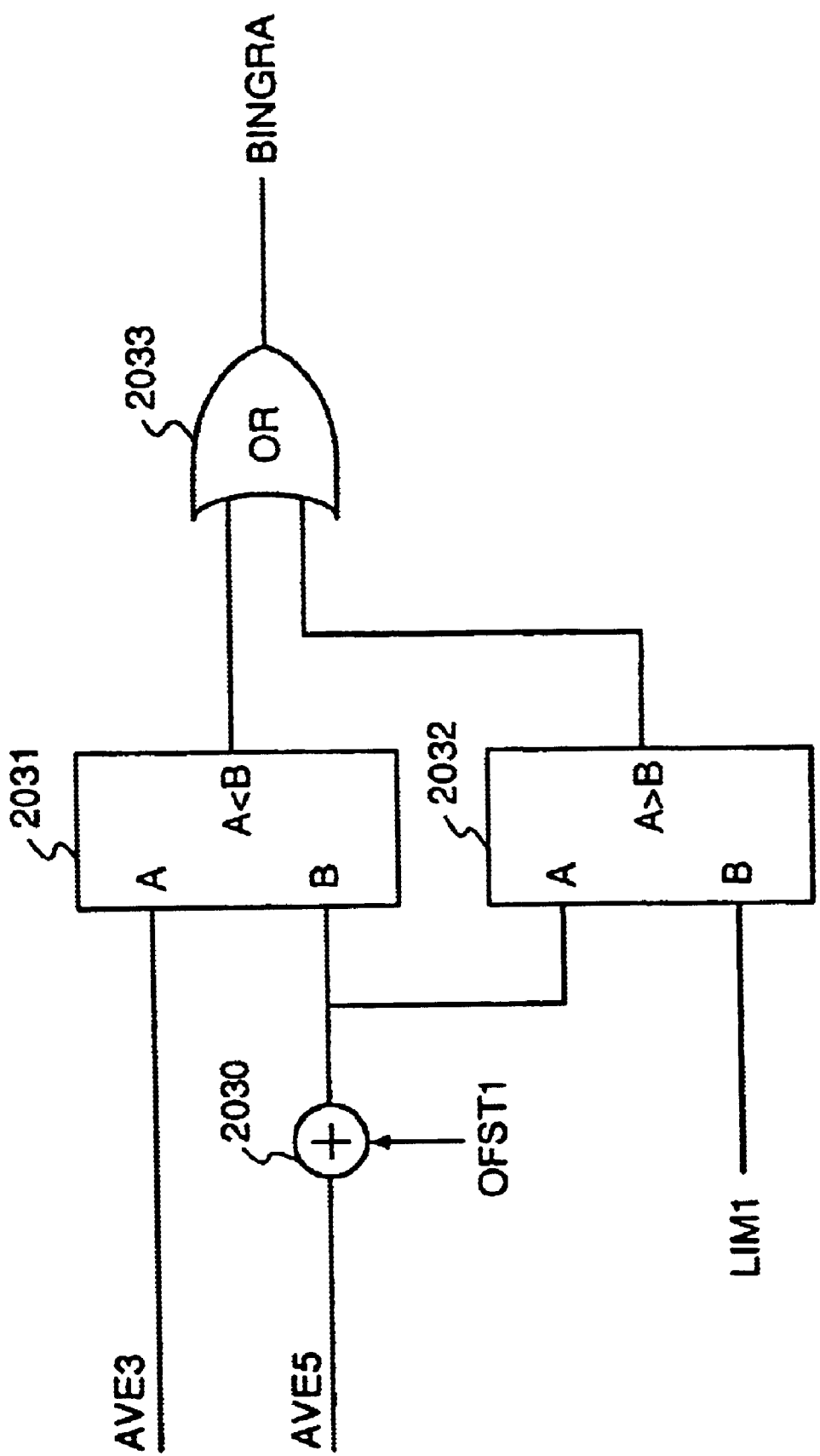
FIG. 15 is a block diagram illustrating an internal configuration of a character/halftone detector 2013.

FIG. 15 is a block diagram illustrating the internal construction of the character/halftone detector 2013. As shown in FIG. 15, in the character/halftone detector 2013, a suitable off-set value OFST1 is added to the AVE5 by adder 2030, then the obtained value and the AVE5 are compared by a comparator 2031. Further, a comparator 2032 compares the output from the adder 2030 with a suitable limit value LIM 1. Then the output value from these comparators are inputted into an OR circuit 2033.

At the OR circuit 2033 an output signal BINGRA becomes a logical "H", when $$AVE5+OFST1>AVE3 \quad (3)$$

or $$AVE5+OFST1>LIM1 \quad (4)$$

is satisfied. In other words, at the character/halftone detector, when there exists density change around the pixel of interest (edge portion of a character), or pixels which are near the pixel of interest are denser than a predetermined value (inside of a character and halftone portion), the character/halftone area signal BINGRA becomes logical "H".

Figure 16:
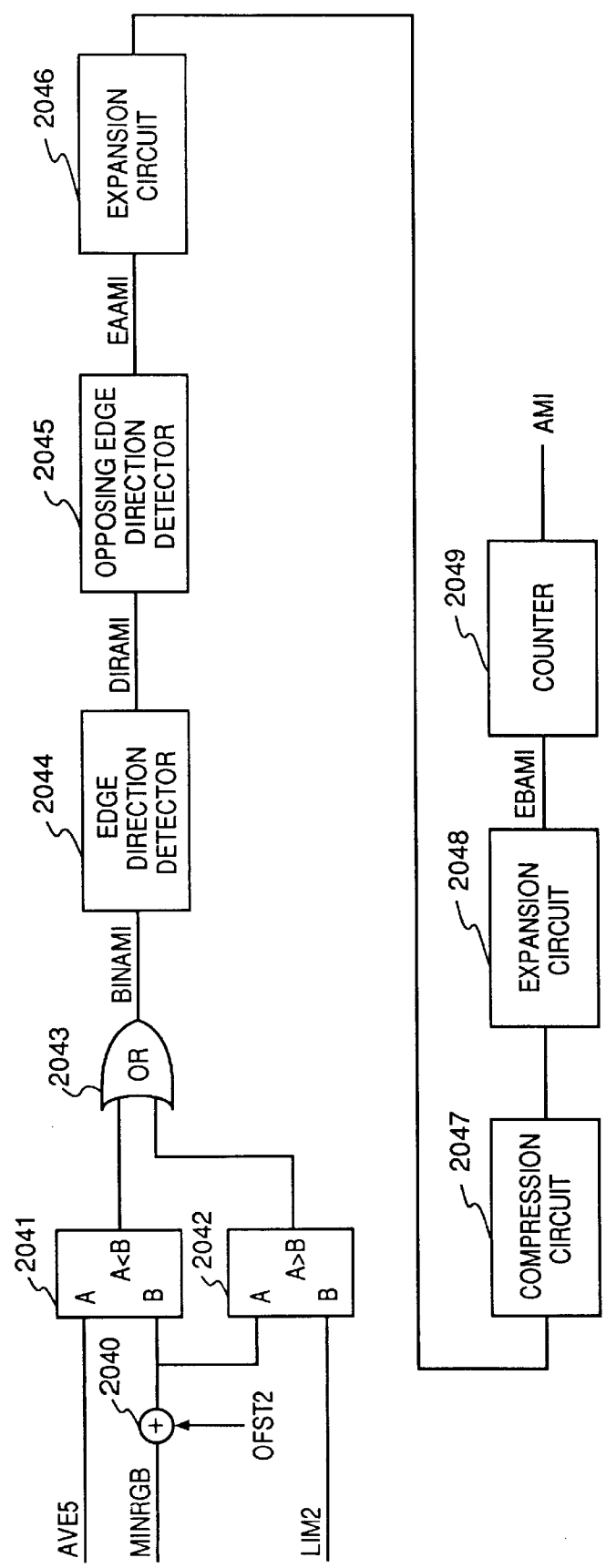
FIG. 16 is a block diagram illustrating a detailed configuration of a screened dot area detector 2014.

Meanwhile, at a screened dot area detector 2014 whose detailed configuration is shown in FIG. 16, in order to detect a screened dot area, an adder 2040 adds a suitable off-set value OFST2 to the MIN RGB which is detected by the minimum value detector 2011, then a comparator 2041 compares the added result with the AVE5. Whereas a comparator 2042 compares the output from the adder 2040 with a suitable limit value LIM2. Each output value from the comparators is inputted into an OR circuit 2042, where an output signal BINAMI from the OR circuit 2043 becomes a logical "H" under the following conditions.

$$\text{MIN } RGB+OFST2>AVE5 \quad (5)$$

$$\text{MIN } RGB+OFST2>LIM2 \quad (6)$$

Then the edge direction of each pixel is detected at an edge direction detector 2044 by using the BINAMI signal.

Figure 17:
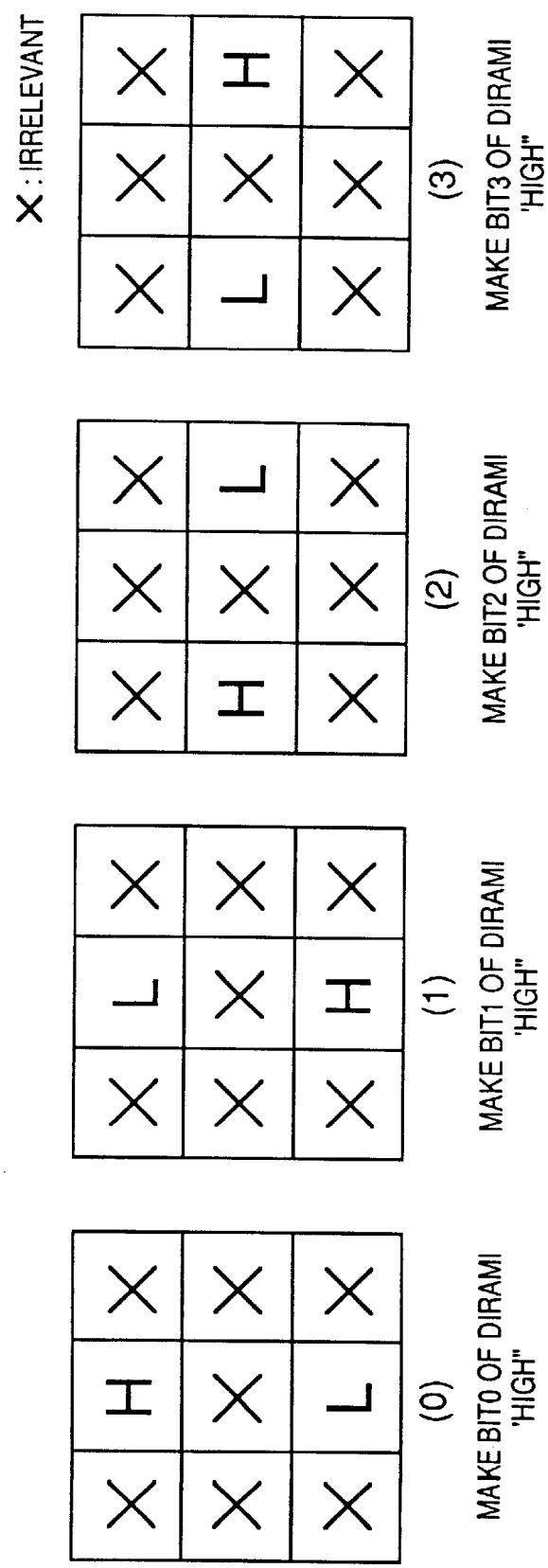
FIG. 17 shows regulations of edge direction detection by an edge direction detector 2044.

FIG. 17 illustrates patterns to detect the edge direction at the edge direction detector 2044. When the 8 pixels surrounding the pixel of interest fulfill conditions indicated by (0) to (3) shown in FIG. 17, one of zero-th bit to third bit of edge direction signal, DIRAMI, becomes a logic value of "H".

Further, at an opposing edge detector 2045 provided in the downstream of the edge direction detector 2044, edges which oppose each other are detected in an area of 5×5 pixels which includes the pixel of interest. Therefore, as shown in FIG. 18, rules for detecting opposing edges in the coordinate system in which the DIRAMI signal corresponding to the pixel of interest represents A33 are shown below.

(1) Bit 0 of one of A11, A21, A31, A41, A51, A22, A32, A42, A33 is "H", and bit 1 of one of A33, A24, A34, A44, A15, A25, A35, A45, A55 is "H".

(2) Bit 1 of one of A11, A21, A31, A41, A51, A22, A32, A42, A33 is "H", and bit 0 of one of A33, A24, A34, A44, A15, A25, A35, A45, A55 is "H".

(3) Bit 2 of one of A11, A12, A13, A14, A15, A22, A23, A24, A33 is "H", and bit 3 of one of A33, A42, A43, A44, A51, A52, A53, A54, A55 is "H".

(4) Bit 3 of one of A11, A12, A13, A14, A15, A22, A23, A24, A33 is "H", and bit 2 of one of A33, A42, A43, A44, A51, A52, A53, A54, A55 is "H".

When one of the above-described conditions, (1) to (4), is fulfilled, the EAAMI becomes "H" (In a case where an opposing edge is detected at the opposing edge detector 2045, an opposing edge signal EAAMI becomes "H").

In the expansion circuit 2046, the EAAMI signal is applied with an expansion of 3×4 pixels, and if there is a pixel indicating "H" in a block 3×4 pixels neighboring a pixel of interest, then an EAAMI signal of the pixel of interest is replaced by "H". Further, detection result which shows an isolated state in an area of 5×5 pixels is eliminated by using a compression circuit 2047 and an expansion circuit 2048, thereby an output signal EBAMI is obtained. Note that the compression circuit 2047 outputs "H" only when all the inputted signals are "H".

Next, a counter 2049 counts a number of pixels which causes output signals from the expansion circuit 2048 EBAMI "H", by using a window with a preferred size. In this embodiment, an area of 5×65 pixels including a pixel of interest is referred. An example of the shape of the window is shown in FIG. 19.

In FIG. 19, a number of sampling points in the window is 9 in the main scanning direction and 5 in five lines in the sub-scanning direction, which counts 45 points altogether, at every 4 pixels in the main direction. A window for a pixel of interest moves in the main scanning direction, thus a total of nine windows (1) to (9) in FIG. 19 are prepared. Accordingly, an area of 5×65 pixels around the pixel of interest is preferred. Then, in each window, the EBAMI is counted, and when a number of EBAMI of "H" of at least one of the nine windows exceeds an arbitrary threshold value, the screened dot area detector 2014 in FIG. 14 outputs a screened dot area signal AMI as a logical "H".

By processing the signals at the screened dot area detector 2014, it is possible to detect a screened dot image, detected as a group of isolated points by the aforesaid BINGRA signal, as an area signal. Then, these detected character/halftone area signal BINGRA and screened dot area signal AMI are processed with a logical OR operation by the OR circuit 2015 in FIG. 14. As a result, a binarized signal PICT with respect to the input image is generated. The PICT signal is inputted into an area size determination circuit 2016, whereat the area size of the binarized signal is determined.

The group of isolated points is described below.

The aforesaid image area determination is performed on a binarized image which is obtained by binarizing an image at preferred density. At this time, a portion occupying some area size, such as dots, lines, and characters are determined as a binary image. However, by simply binarizing a screened dot image, there is generated a group of tiny dots which are components of a screened dot.

Therefore, by determining whether or not there exists any group composed of isolated points in an area of some size, whether or not a dot is a part of a screened dot is determined. In other words in a case where there are great many dots in a preferred area, the area is determined to correspond a screened dot image, whereas in a case where there is no dot around the pixel of interest, even a pixel of interest is a part of dots, the pixel of interest is determined to be a part of a character.

Figure 20:
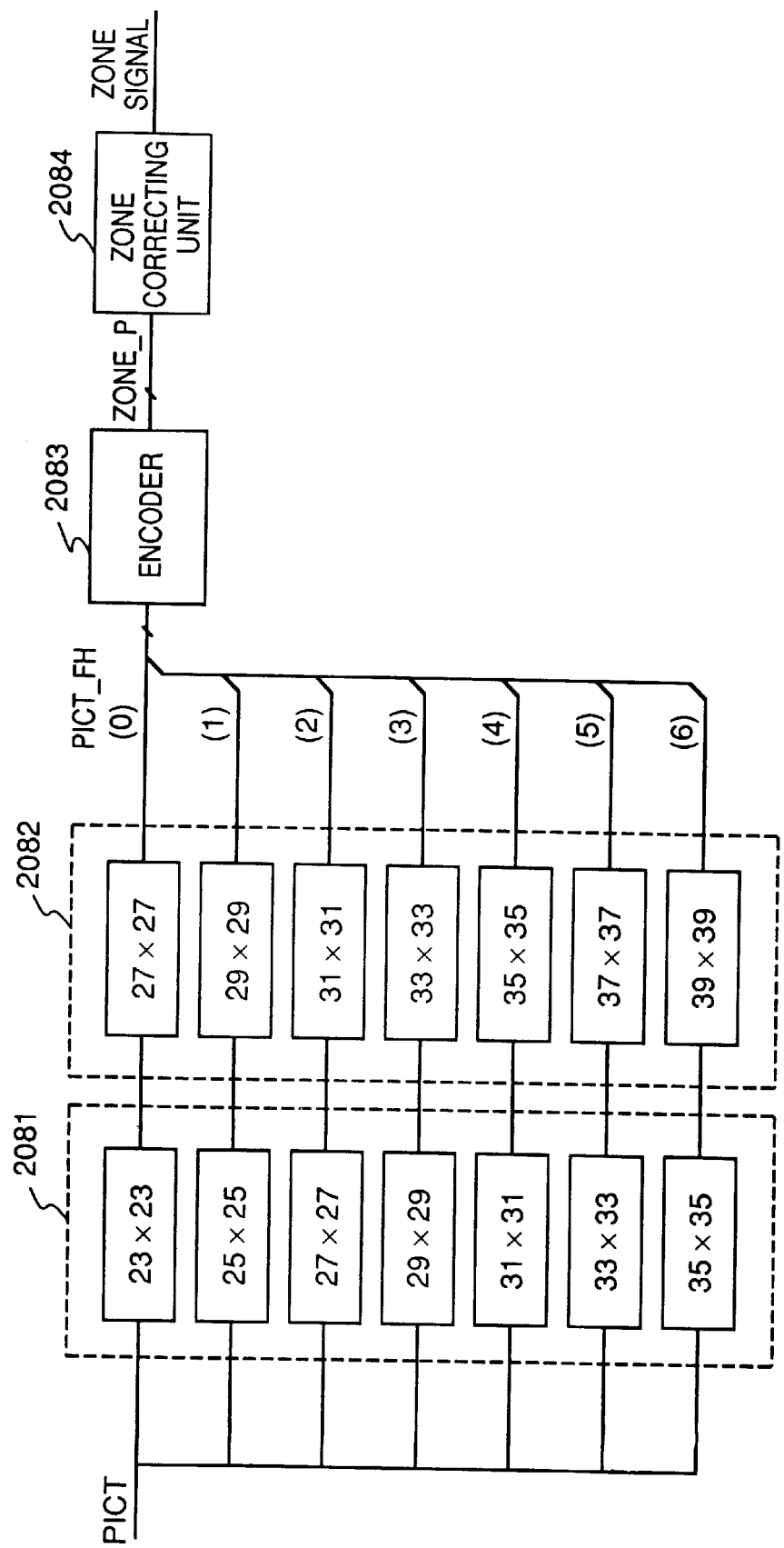
FIG. 20 is a block diagram showing an internal configuration of an area size determination circuit 2016.
Figure 21:
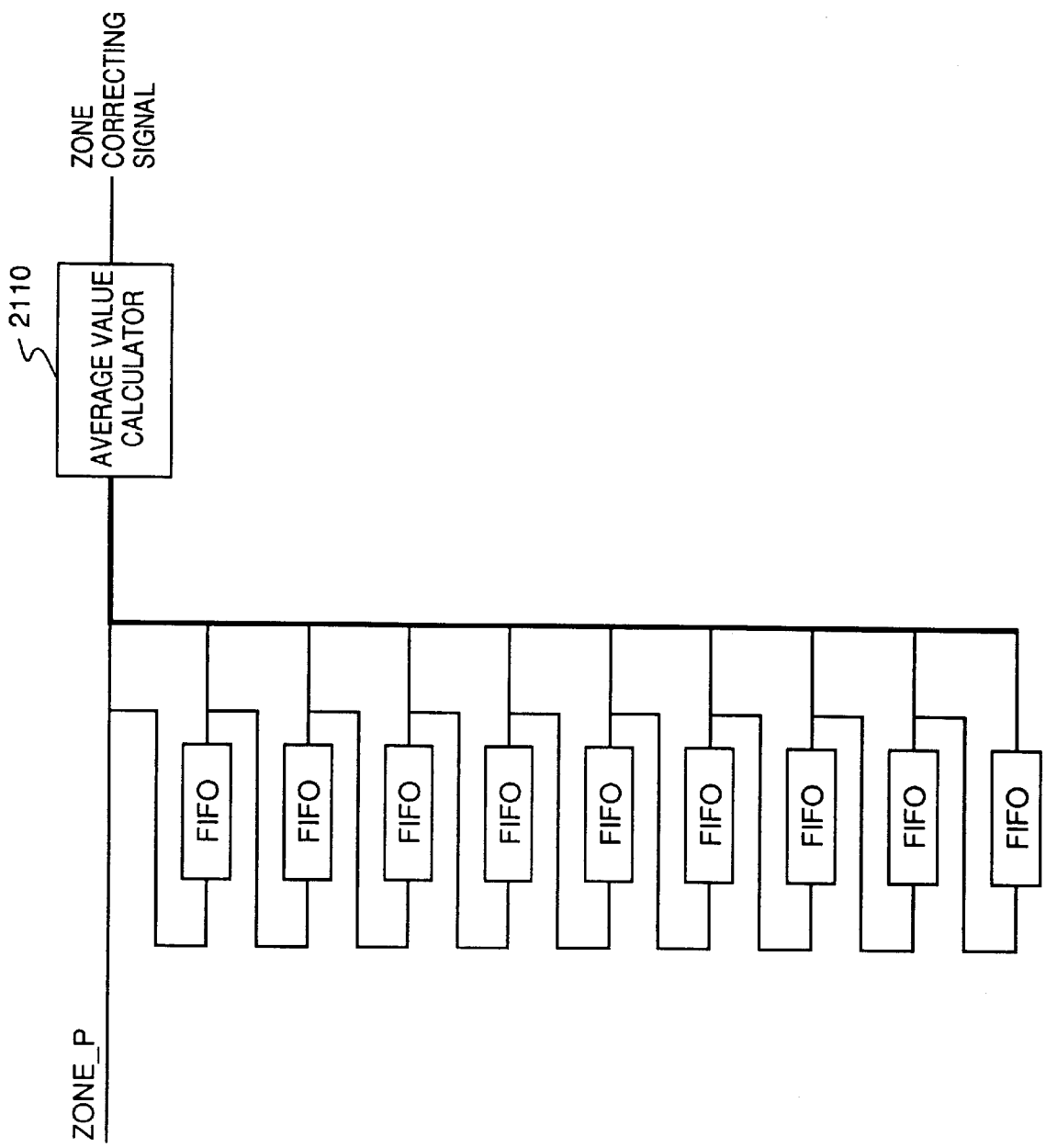
FIG. 21 is a block diagram illustrating a configuration of a ZONE correcting unit 2084.

FIG. 20 is a block diagram illustrating an internal configuration of the area size determining circuit 2016. In the circuit in FIG. 20, there are a plurality of pairs of compression circuits 2081 and expansion circuits 2082, each of which has a referring area of different size. Note that the compression circuit 2081 performs a logical AND operation on data inside of a block, and the expansion circuit 2082 performs a logical OR operation on the data inside of the block. The inputted PICT signal is line-delayed depending upon the size of the compression circuit, and inputted into the compression circuit 2081. In this embodiment, seven different kinds of compression circuits ranging from a size of 23×23 pixels to 35×35 pixels, shown in FIG. 20, are prepared to use.

A signal outputted from the compression circuit 2081 is inputted into the expansion circuit 2082 after line-delayed. In the present embodiment, seven kinds of expansion circuits which range from a size of 27×27 pixels to 39×39 pixels shown in FIG. 20, and an output signal PICT_FH from each expansion circuit is obtained.

Figure 22:
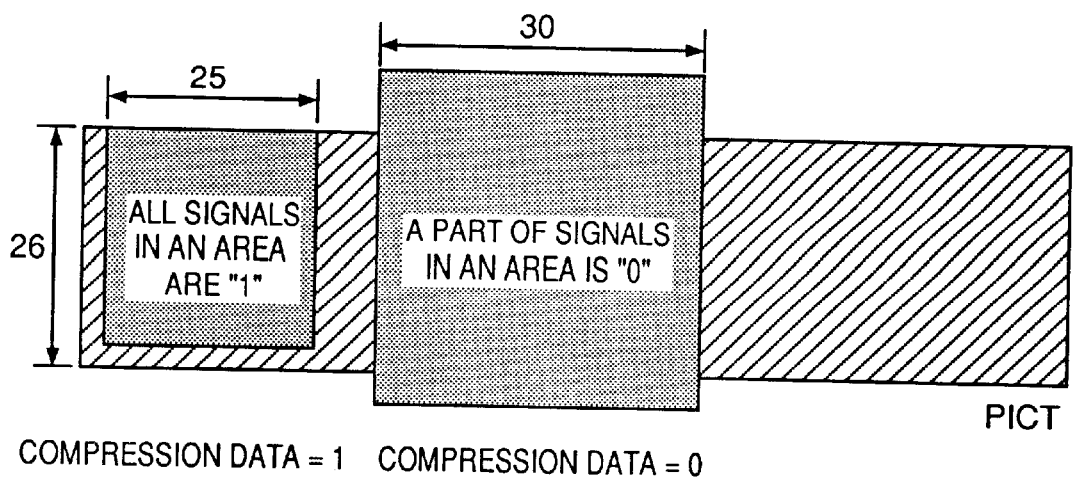
FIG. 22 is an explanatory view in which value of PICT_FH is determined depending upon character thickness.

Regarding the aforesaid output signal PICT_FH, if a pixel of interest is a part of a character, a value of the PICT_FH is determined depending upon thickness of the character. This determination is illustrated in FIG. 22. For example, if PICT signals exist in the shape of a rectangle having 26 pixels in width, any compression over a size of 27×27 pixels results in outputting all 0's, whereas, after performing compression by a size less than 25×25 pixels, expansion corresponding to each size is performed, then output signals PICT_FH existing in a shape of rectangle which has 30 pixels in width can be obtained.

Thus, by inputting these signals PICT_FH into an encoder 2083, an image area signal ZONE_P to which a pixel of interest belongs is obtained. Note that FIG. 23 shows encoding rules in the encoder 2083.

By performing aforesaid processes, a photographic image and a screened dot image which have PICT signals of "H" in a large area are denoted as an area 7 (maximum value), whereas a character and a line which have an area size whose value is smaller (narrower) than the maximum value are denoted as multi-valued image areas depending upon their size (thickness). In this embodiment, the ZONE signal has three bits and the thickness of a character is described in 8 degrees. The thinnest character is denoted as a value of 0, and the thickest character (including an area besides characters) is denoted as a value of 7.

A ZONE correcting unit 2084 in FIG. 20 has an average value calculator 2110 where the ZONE_P which is line-delayed by a plurality of FIFOs is inputted, and there, an average value inside of an area of 10×10 pixels is calculated. The ZONE_P signal is larger in value as a character becomes thicker, likewise, is smaller in value as a character becomes thinner. Therefore, the output from the average value calculator 2110 becomes a correction ZONE signal itself.

It is desirable that a block size to be used for correction should be determined in accordance with a block size which is for determining thickness of a character. In addition, by performing an onward process by using the correction ZONE signal, determination of thickness is smoothly performed even at points where the thickness of a character/line changes suddenly. Thereby, the deterioration of image quality, caused by a change in a black character process, can be improved.

As described above, an area where the ZONE signal is in a 7th grade can be regarded as a halftone area. Thus, this assumption makes it possible to distinguish a character/line existing in a screened dot area and halftone area from a character/line in other areas, in accordance with the ZONE signal and an edge signal. The method to perform the aforesaid process will be described below.

Figure 24:
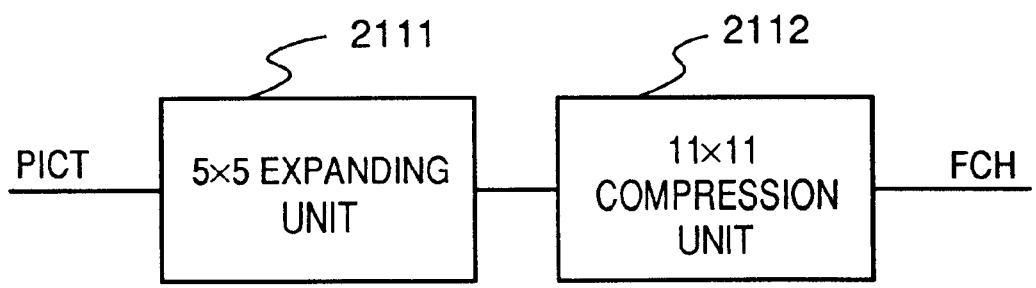
FIG. 24 is an algorithm of character detection in screened dot/halftone.

FIG. 24 shows an algorithm for detecting characters in screened dot/halftone area. Here, on the aforesaid PICT signal, expansion process is performed by using a 5×5 block at a unit denoted by a numeral 2111. With this process, a screened dot area, in which a character detection tends to be inadequate, is corrected.

Then, compression process using an 11×11 block is applied to an output signal from the unit 2111 at a unit denoted by a numeral 2112. A signal FCH obtained performing above-mentioned processes becomes a signal compressed by 3 pixels with respect to the PICT signal.

FIG. 25 shows the process performed by using the aforesaid algorithm. In FIG. 25, by combining the FCH signal, the ZONE signal, and the EDGE signal, an edge whose background color is white can be distinguished from an edge in the screened dot/halftone area. Therefore, a black character process can be performed without enhancing screened dot components in the screened dot image, further, without processing parts, such parts as edges of a photograph, where the black character correction is not necessary.

Following is an explanation on the LUT 117 composing the black character determination circuit 113 in FIG. 6.

Signals which are determined by the character thickness determination circuit 114, the edge detector 115, and the chromaticity determination circuit 116 are inputted to the LUT 117, and the LUT 117 outputs signals "ucr", "filter", and "sen" for processes as shown in tables in FIGS. 26A and 26B. These signals are for controlling masking UCR coefficients, space filter coefficients, and printer resolution, respectively.

In the tables shown in FIGS. 26A and 26B, each signal and its value are as follow:

sen—0: 200 lines, 1: 400 lines filter—0: smoothing, 1: strong edge enhancement, 2: medium edge enhancement, 3: weak edge enhancement ucr—0 to 7: more black—less black FCH—0: edge of an image, 1: not an edge of an image Further, the characteristics shown by the tables shown in FIGS. 26A and 26B are:

(1) Possible to perform multi-valued black character process depending on thickness of a character (2) Possible to select a black character processing area depending on thickness of a character, since plural ranges of an edge area are prepared. Note that, in this embodiment, the largest area is processed for the thinnest character (3) Perform different black character processes at an edge of a character and the inside of the character, thereby realize smoother quantity change of black (4) Process a character in screened dot/halftone area differently from a character having a white background (5) Change coefficients of respective space filters corresponding to an edge of a character, inside of the character, and screened dot/halftone image. Further, coefficients are changed depending upon the thickness of the character with respect to the edge of the character (6) Change resolution of a printer depending upon thickness of a character (7) Process performed on a black character is applied to any color character besides masking UCR coefficients.

Note that there can be plural kinds of processing methods in accordance with combinations of input signals, thus a processing method is not limited to the method which is employed in the present embodiment.

Meanwhile, at the masking UCR processing circuit 109, a black signal Bk is generated and applied with output masking in accordance with the UCR control signal ucr outputted from the LUT 117.

Equations for the masking UCR operation are shown in FIG. 28.

First, a minimum value MIN CMY of C1, M1, and Y1 is obtained, and Bk1 is obtained by using an equation (2101). Next, by an equation (2102), C2, M2, Y2, and Bk2 are outputted by performing a masking of 4×8. In the equation (2102), coefficients m11 to m84 are masking coefficients which are determined depending upon the printer to be used, and coefficients k11 to k84 are UCR coefficients which are determined depending upon a UCR signal.

With regard to a screened dot/halftone image (the ZONE signal is 7), all the UCR coefficients are 1.0, however, as for a thinnest character (the ZONE signal is 0) the UCR coefficients are set so that a color signal Bk can be outputted. Further, regarding a character of a medium thickness, the UCR coefficients are set so that the change of color depending upon its thickness becomes smooth, thus controlling the amount of Bk.

Further, two filters of a size of 5×5 pixels are provided in the space filter processing unit 111, and an output signal from a first filter is inputted into a second filter. Four coefficients, a smoothing 1, a smoothing 2, an edge enhance 1, and an edge enhance 2 are provided as filter coefficients, and the coefficients are changed by each pixel in accordance with the filter signal from the LUT 117. Furthermore, edge enhancement with less moire is realized by applying edge enhancement after smoothing by using two filters, and by combining two kinds of edge enhancement coefficients, an image of higher quality can be outputted.

According to the embodiment as described above, when processing an image by determining thickness of a character/line in an image and combining information on a character/line outline and on chromaticity, thickness determination becomes smoother at the part where the thickness of a character and a line changes suddenly, by correcting a thickness determination signal so that the thickness of a character and a line changes continuously. Accordingly, high quality black reproduction becomes possible.

It should be noted that, in the embodiment as described above, a RGB signal is used as an input to the black character determination unit 113 as shown in FIG. 6, however, the input signal is not limited to the RGB signal, and a CMY signal which is an output from the LOG converter 107 can be used as well, for instance.

Figure 27:
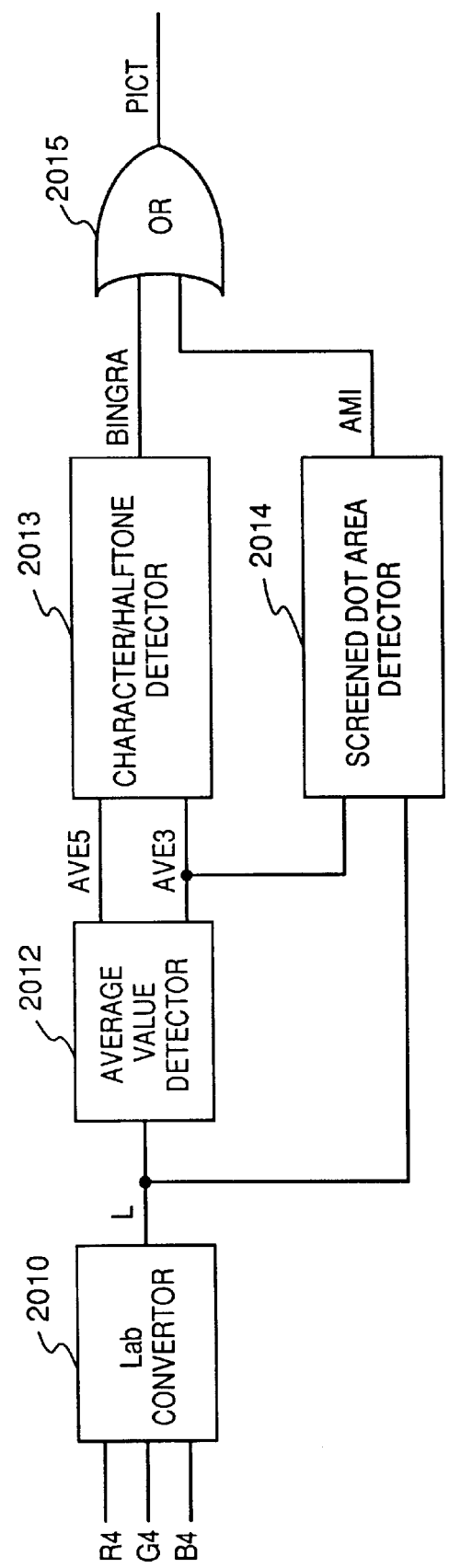
FIG. 27 is a block diagram showing a modified example of the character thickness determination circuit 114.

Further, in the embodiment described above, a RGB signal is inputted to the character thickness determination circuit 114 composing the black character determination unit 113. However, the present invention is not limited to the above processing. For example, by obtaining a L signal from a Lab converter 2010, as shown in FIG. 27, then an onward processes can be performed by using the L signal. Note that in FIGS. 26A and 26B, elements of the character thickness determination circuit identical to those in FIG. 14 have the same reference numerals.

The present invention can be applied to a system constituted by a plurality of devices, or to an apparatus comprising a single device. Furthermore, the invention is applicable also to a case where the object of the invention is attained by supplying a program to a system or apparatus.

Further, in the embodiment described above, a black character area is distinguished, however, a color character area, such as red and blue character areas, can be distinguished instead. Furthermore, a process of color character can be controlled in accordance with a kind of area to be distinguished.

Further, in the embodiment described above, an algorithm is realized by using a hardware, however, it can be performed by using a software in a computer, instead.

Further, thickness of a character can be detected by using a method, such as a method of distinguishing continuity of a predetermined color by pattern matching, different from the one described above.

Further, character recognition such as in an optical character reader can be performed on the basis of a result of character thickness detection. In that case, it is possible to recognize a size of the character depending upon the thickness of the character.

The present invention is not limited to the above embodiments and various changes and modifications can be made within the spirit and scope of the present invention. Therefore to appraise the public of the scope of the present invention, the following claims are made.

What is claimed is:

1. An image processing apparatus comprising:
    input means for inputting image data representing an image;
    first determining means for determining whether or not a pixel of interest is a part of a character or a halftone area by detecting, based on the input image data, an amount of change in densities between the pixel of interest and neighboring pixels of the pixel of interest;
    second determining means for determining, based on the input image data, whether or not the pixel of interest is a part of a screened dot area;
    detecting means for detecting a thickness of a character or a line in the image for each pixel that is part of the character or the line, based on the determination results provided by said first and second determining means; and
    controlling means for controlling black-character processing of the image in units of a pixel, based on the detected thickness provided by said detecting means in units of a pixel.

2. The image processing apparatus according to claim 1, further comprising discriminating means for discriminating an edge of the character area.

3. The image processing apparatus according to claim 1, further comprising extracting means for extracting saturation information from the input image data.

4. The image processing apparatus according to claim 1, wherein said input means is reading means for scanning an image and generating image data.

5. The image processing apparatus according to claim 1, further comprising processing means for performing a conversion on a spatial frequency component of the image data.

6. The image processing apparatus according to claim 1, further comprising processing means for performing a UCR (under-color removal) process on the image data.

7. The image processing apparatus according to claim 1, further comprising image forming means for forming an image on a record medium on the basis of the image data which is processed by said processing means.

8. An image processing method comprising the steps of:
    inputting image data representing an image;
    determining, first, whether or not a pixel of interest is a part of a character or a halftone area by detecting, based on the input image data, an amount of change in densities between the pixel of interest and neighboring pixels of the pixel of interest;

determining, second, based on the input image data, whether or not the pixel of interest is a part of a screened dot area;

detecting a thickness of a character or a line in the image for each pixel that is part of the character or the line, based on the determination results obtained in said first and second determining steps; and controlling black-character processing of the image in units of a pixel based on the detected thickness obtained in said detecting step, in units of a pixel.

9. The image processing method according to claim 8 further comprising a step of discriminating an edge of the character area.

10. The image processing method according to claim 8 further comprising a step of extracting saturation information from the input image data.

11. The image processing method according to claim 8 wherein said inputting step includes scanning an image and generating image data.

12. The image processing method according to claim 8 further comprising the step of performing a conversion on a spatial frequency component of the image data.

13. The image processing method according to claim further comprising the step of performing a UCR (under-color removal) processing on the image data.

14. The image processing method according to claim 8, further comprising the step of forming an image on a record medium on the basis of the image data which is processed in said processing step.

* * * * *

UNITED STATES PATENT AND TRADEMARK OFFICE
CERTIFICATE OF CORRECTION

PATENT NO. : 6,744,921 B1
DATED : June 1, 2004
INVENTOR(S) : Yoshiki Uchida et al.

It is certified that error appears in the above-identified patent and that said Letters Patent is hereby corrected as shown below:

Title page,
Item [56], References Cited, U.S. PATENT DOCUMENTS,
"5,164,996 A    11/1992        Paster" should read
-- 5,164,996 A    11/1992        Pastor --.
Item [57], ABSTRACT,
Line 12, "and" should read -- and the --.

Column 1,
Lines 52, 53 and 57, "can not" should read -- cannot --.

Column 2,
Line 1, "image. Especially," should read -- image, especially, --.

Column 3,
Line 54, "hereinafter)" should read -- hereinafter). --.

Column 4,
Line 33, "parallel" should read -- parallel to --; and
Line 36, "thus" should read -- the --.

Column 5,
Line 43, "that" should read -- to that --.

Column 6,
Line 37, "follow." should read -- follows. --.

Column 8,
Line 1, "reduce" should read -- reduces --.

UNITED STATES PATENT AND TRADEMARK OFFICE
CERTIFICATE OF CORRECTION

PATENT NO. : 6,744,921 B1
DATED : June 1, 2004
INVENTOR(S) : Yoshiki Uchida et al.

It is certified that error appears in the above-identified patent and that said Letters Patent is hereby corrected as shown below:

<u>Column 12,</u>
Line 34, "follow:" should read -- follows: --.

Signed and Sealed this

Twenty-seventh Day of September, 2005

JON W. DUDAS
*Director of the United States Patent and Trademark Office*